(12) United States Patent
Makuta

(10) Patent No.: US 12,492,315 B2
(45) Date of Patent: Dec. 9, 2025

(54) ARTICLE WITH RECORDED IMAGE, ACTIVE ENERGY RAY CURABLE-TYPE INK, INK SET, AND MANUFACTURING METHOD OF ARTICLE WITH RECORDED IMAGE

(71) Applicant: FUJIFILM Corporation, Tokyo (JP)

(72) Inventor: Toshiyuki Makuta, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 407 days.

(21) Appl. No.: 18/146,454

(22) Filed: Dec. 26, 2022

(65) Prior Publication Data

US 2023/0146828 A1     May 11, 2023

Related U.S. Application Data

(63) Continuation of application No. PCT/JP2021/022725, filed on Jun. 15, 2021.

(30) Foreign Application Priority Data

Jul. 1, 2020    (JP) ................................. 2020-114335

(51) Int. Cl.
| | |
|---|---|
| *C09D 11/101* | (2014.01) |
| *B41J 2/01* | (2006.01) |
| *B41J 2/21* | (2006.01) |
| *C09C 1/62* | (2006.01) |
| *C09D 11/322* | (2014.01) |
| *C09D 11/40* | (2014.01) |

(52) U.S. Cl.
CPC ............... *C09D 11/101* (2013.01); *B41J 2/01* (2013.01); *B41J 2/2107* (2013.01); *C09C 1/62* (2013.01); *C09D 11/322* (2013.01); *C09D 11/40* (2013.01)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 25/001; B41J 25/34; B41J 25/003; B41J 2/18; B41J 25/312; B41J 2025/008; B41J 2202/21; B41J 2/17596; B41J 2/16508; B41J 2/1652; B41J 2/175; B41J 2/17563; B41M 5/0011; B41M 5/0017; B41M 5/0023; B41M 5/0047; B41M 7/00; B41M 7/0072; B41M 5/52; B41M 5/5218; B41M 5/5227; C09D 11/326; C09D 11/107; C09D 11/03; C09D 11/037; C09D 11/033; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106

See application file for complete search history.

(56) References Cited

U.S. PATENT DOCUMENTS

| | | | |
|---|---|---|---|
| 9,211,725 B2 | 12/2015 | Umebayashi | |
| 2002/0158236 A1 | 10/2002 | Kikkawa et al. | |
| 2008/0213518 A1* | 9/2008 | Oyanagi | C09D 11/324 428/209 |
| 2008/0239043 A1* | 10/2008 | Nakazawa | B41J 11/0021 347/42 |
| 2010/0026751 A1 | 2/2010 | Oyanagi | |
| 2010/0036036 A1 | 2/2010 | Oyanagi | |
| 2011/0040014 A1* | 2/2011 | Kim | C08K 3/08 977/773 |
| 2012/0104330 A1* | 5/2012 | Choi | C23C 18/06 252/512 |
| 2012/0174824 A1 | 7/2012 | Takenaka et al. | |
| 2012/0295082 A1* | 11/2012 | Toyoda | B22F 1/052 347/102 |
| 2013/0135384 A1 | 5/2013 | Oyanagi | |
| 2014/0035995 A1 | 2/2014 | Chou et al. | |

(Continued)

FOREIGN PATENT DOCUMENTS

| | | |
|---|---|---|
| CN | 1362936 | 8/2002 |
| CN | 102498181 | 6/2012 |

(Continued)

OTHER PUBLICATIONS

"Office Action of Japan Counterpart Application", issued on Jan. 9, 2024, with English translation thereof, p. 1-p. 6.

(Continued)

*Primary Examiner* — Manish S Shah
(74) *Attorney, Agent, or Firm* — JCIPRNET

(57) ABSTRACT

Provided is an active energy ray curable-type ink comprising: scale-like metal particles; and polymerizable compounds, wherein the scale-like metal particles contain indium and have an average equivalent circle diameter of 50 nm to 1,000 nm and an average aspect ratio, which is a ratio of the average equivalent circle diameter to an average thickness, of 5 to 100.

18 Claims, No Drawings

(56) References Cited

U.S. PATENT DOCUMENTS

| | | | |
|---|---|---|---|
| 2015/0125671 A1 | 5/2015 | Ogawa et al. | |
| 2016/0257827 A1* | 9/2016 | Takiguchi | B32B 27/18 |
| 2016/0264794 A1* | 9/2016 | Takiguchi | C09D 11/107 |
| 2017/0028743 A1 | 2/2017 | Ogawa et al. | |
| 2019/0276692 A1* | 9/2019 | Furukawa | B41M 5/5218 |
| 2019/0351690 A1 | 11/2019 | Nishizawa et al. | |
| 2020/0385588 A1* | 12/2020 | Hamanaka | C09D 4/00 |
| 2021/0094313 A1* | 4/2021 | Kida | B41M 5/0017 |
| 2022/0048306 A1 | 2/2022 | Nishizawa et al. | |
| 2023/0023473 A1* | 1/2023 | Araki | B41M 7/0081 |
| 2023/0312955 A1* | 10/2023 | Hiruma | C09D 11/326 347/102 |
| 2023/0364928 A1* | 11/2023 | Endo | B41J 11/002 |

FOREIGN PATENT DOCUMENTS

| | | | |
|---|---|---|---|
| CN | 103402781 | 11/2013 | |
| EP | 3699239 | 8/2021 | |
| JP | 2010030139 | 2/2010 | |
| JP | 2010043153 | 2/2010 | |
| JP | 2011052041 | 3/2011 | |
| JP | 2012017466 | 1/2012 | |
| JP | 5620564 | 11/2014 | |
| JP | 2015089652 | 5/2015 | |
| JP | 2015089653 | 5/2015 | |
| JP | 2017002162 | 1/2017 | |
| JP | 2017052870 | 3/2017 | |
| JP | 6580742 | 9/2019 | |
| JP | 2019199061 | 11/2019 | |
| WO | 0156927 | 8/2001 | |
| WO | WO-2019111822 A1 * | 6/2019 | C09D 11/322 |

OTHER PUBLICATIONS

"Search Report of Europe Counterpart Application", issued on Apr. 22, 2024, pp. 1-10.

"Office Action of China Counterpart Application", with English translation thereof, issued on Dec. 16, 2024, pp. 1-20.

"International Search Report (Form PCT/ISA/210) of PCT/JP2021/022725", mailed on Sep. 7, 2021, with English translation thereof, pp. 1-9.

"Written Opinion of the International Searching Authority (Form PCT/ISA/237) of PCT/ JP2021/022725", mailed on Sep. 7, 2021, with English translation thereof, pp. 1-8.

* cited by examiner

ARTICLE WITH RECORDED IMAGE, ACTIVE ENERGY RAY CURABLE-TYPE INK, INK SET, AND MANUFACTURING METHOD OF ARTICLE WITH RECORDED IMAGE

CROSS-REFERENCE TO RELATED APPLICATION

This application is a continuation application of International Application No. PCT/JP2021/022725 filed Jun. 15, 2021, the disclosure of which is incorporated herein by reference in its entirety. Further, this application claims priority from Japanese Patent Application No. 2020-114335, filed Jul. 1, 2020, the disclosure of which is incorporated herein by reference in their entirety.

BACKGROUND OF THE INVENTION

1. Field of the Invention

The present disclosure relates to an article with a recorded image, an active energy ray curable-type ink, an ink set, and a manufacturing method of an article with a recorded image.

2. Description of the Related Art

In recent years, studies have been conducted on a method of recording an image having metallic glossiness by using an active energy ray curable-type ink containing polymerizable compounds and on an article with a recorded image manufactured by the method.

The article with a recorded image is also called a record, a printed article, or the like.

For example, JP2019-199061A discloses a manufacturing method of a printed article that makes it possible to manufacture a printed article having excellent metallic gloss.

The manufacturing method of a printed article disclosed in JP2019-199061A comprises
  a coating step of coating a substrate with an ink composition in the form of liquid droplets by an ink jet method, the ink composition containing an external stimulus film-forming resin that forms a film by an external stimulus consisting of radiation or heat and scale-like particles that contain a metal,
  a standby step of putting a predetermined standby time such that the scale-like particles are brought close to the surface of the liquid droplets and aligned substantially parallel to the surface of the liquid droplets and that the liquid droplets are wetted and spread, and
  a film forming step of forming a film by applying an external stimulus to the ink composition having undergone the standby step such that a layer with a metallic gloss showing metallic gloss is formed.

In addition, JP2015-89652A discloses a manufacturing method of a printed article that makes it possible to manufacture a record provided with a shiny printing portion with high accuracy.

The manufacturing method of a printed article disclosed in JP2015-89652A has
  a first ink applying step of applying a first ink containing a first polymerizable compound polymerized by irradiation with ultraviolet rays to a substrate by an ink jet method,
  a first curing step of polymerizing-curing the first polymerizable compound by irradiation with ultraviolet rays to form a first layer,
  a second ink applying step of applying a second ink to a region where the first layer is formed by an ink jet method, the second ink containing a second polymerizable compound that is polymerized by irradiation with ultraviolet rays and metal powder, and
  a second curing step of polymerizing-curing the second polymerizable compound by irradiation with ultraviolet rays to form a second layer,
  in which an amount of the first ink jetted into the region is 2.0 g/m$^2$ or more and 20.0 g/m$^2$ or less per unit area,
  a time from landing of liquid droplets of the first ink to irradiation of the liquid droplets with ultraviolet rays is 0.0010 seconds or longer and 1.0 seconds or less,
  an amount of the second ink jetted into the region is 10% by volume or more and less than 80% by volume per unit area with respect to the amount of the first ink jetted into the region, and
  a time from landing of liquid droplets of the second ink to irradiation of the liquid droplets with ultraviolet rays is 5.0 seconds or longer and 60.0 seconds or less.

SUMMARY OF THE INVENTION

In a case where an image having metallic glossiness is recorded using an active energy ray curable-type ink containing polymerizable compounds, sometimes further improvement of the metallic glossiness of the image is required.

An object of the present disclosure is to provide an article with a recorded image comprising an image which is a cured substance of an active energy ray curable-type ink containing polymerizable compounds and has excellent metallic glossiness, and to provide an active energy ray curable-type ink, an ink set, and a manufacturing method of an article with a recorded image that are suitable for manufacturing the article with a recorded image.

Specific means for achieving the above object are as follows.

<1> An article with a recorded image, comprising a substrate and an image disposed on the substrate,
  in which the image is a cured substance of an active energy ray curable-type ink containing scale-like metal particles and polymerizable compounds,
  the scale-like metal particles contain indium and have an average equivalent circle diameter of 50 nm to 1,000 nm and an average aspect ratio, which is a ratio of the average equivalent circle diameter to an average thickness, of 5 to 100, and
  within a cross section of the image, an average angle formed between a longitudinal direction of the scale-like metal particles and a surface of the substrate is 300 or less in a region that is within a distance of 100 nm from a surface of the image, and an average angle formed between the longitudinal direction of the scale-like metal particles and the surface of the substrate is more than 300 in a region that is beyond a distance of 100 nm from the surface of the image.

<2> The article with a recorded image described in <1>, in which within the cross section of the image, the average angle formed between the longitudinal direction of the scale-like metal particles and the surface of the substrate is 100 or less in the region that is within a distance of 100 nm from the surface of the image.

<3> The article with a recorded image described in <1> or <2>, in which the scale-like metal particles are flakes peeled from a metal film containing indium.

<4> An active energy ray curable-type ink containing scale-like metal particles and polymerizable compounds,
  in which the scale-like metal particles contain indium and have an average equivalent circle diameter of 50 nm to 1,000 nm and an average aspect ratio, which is a ratio of the average equivalent circle diameter to an average thickness, of 5 to 100.

<5> The active energy ray curable-type ink described in <4>, in which the scale-like metal particles are flakes peeled from a metal film containing indium.

<6> The active energy ray curable-type ink described in <4> or <5>, in which the polymerizable compounds include at least one of a monofunctional polymerizable compound or a bifunctional polymerizable compound, and
  a total proportion of the monofunctional polymerizable compound and the bifunctional polymerizable compound in the polymerizable compounds is 50% by mass or more.

<7> The active energy ray curable-type ink described in any one of <4> to <6>, in which the polymerizable compounds include a monofunctional polymerizable compound, and
  a proportion of the monofunctional polymerizable compound in the polymerizable compounds is 90% by mass or more.

<8> The active energy ray curable-type ink described in any one of <4> to <6>, in which the polymerizable compounds include a polyfunctional polymerizable compound, and
  a proportion of the polyfunctional polymerizable compound in the polymerizable compounds is 60% by mass or more.

<9> The active energy ray curable-type ink described in any one of <4> to <8>, further containing an organic solvent,
  in which a content of the organic solvent is 1% by mass or more with respect to a total amount of the active energy ray curable-type ink.

<10> The active energy ray curable-type ink described in any one of <4> to <6>, in which the polymerizable compounds include a polymerizable compound having a weight-average molecular weight of 1,000 or more, and
  a proportion of the polymerizable compound having a weight-average molecular weight of 1,000 or more in the polymerizable compounds is 50% by mass or more.

<11> The active energy ray curable-type ink described in <10>, further containing an organic solvent,
  in which a content of the organic solvent is 50% by mass or more with respect to a total amount of the active energy ray curable-type ink.

<12> An ink set comprising the active energy ray curable-type ink described in any one of <4> to <11> and
  at least one of an undercoat liquid or an overcoat liquid,
  in which the undercoat liquid contains polymerizable compounds but does not contain scale-like metal particles, the polymerizable compounds contained in the undercoat liquid include at least one of a monofunctional polymerizable compound or a bifunctional polymerizable compound, a total proportion of the monofunctional polymerizable compound and the bifunctional polymerizable compound in the polymerizable compounds contained in the undercoat liquid is 50% by mass or more,
  the overcoat liquid contains polymerizable compounds and an organic solvent but does not contain scale-like metal particles, a proportion of a polymerizable compound having a weight-average molecular weight of 1,000 or more in the polymerizable compounds contained in the overcoat liquid is 50% by mass or more, and a content of the organic solvent is 50% by mass or more with respect to a total amount of the overcoat liquid.

<13> A manufacturing method of an article with a recorded image using the active energy ray curable-type ink described in any one of <4> to <11>, the manufacturing method including
  an ink applying step of applying the active energy ray curable-type ink on a substrate, and
  a curing step A of curing the active energy ray curable-type ink applied on the substrate by irradiation with an active energy ray A to obtain an image,
  in which a time from landing of the active energy ray curable-type ink on the substrate to start of the irradiation of the active energy ray curable-type ink with the active energy ray A is 0.5 seconds or longer.

<14> The manufacturing method of an article with a recorded image described in <13>, in which the time from landing of the active energy ray curable-type ink on the substrate to start of the irradiation of the active energy ray curable-type ink with the active energy ray A is 1.0 second or longer.

<15> The manufacturing method of an article with a recorded image described in <13> or <14>, in which the time from landing of the active energy ray curable-type ink on the substrate to start of the irradiation of the active energy ray curable-type ink with the active energy ray A is 5.0 seconds or less.

<16> The manufacturing method of an article with a recorded image described in any one of <13> to <15>, in which the irradiation with the active energy ray A is performed in an atmosphere at an oxygen concentration of 0.1% by volume or less.

<17> The manufacturing method of an article with a recorded image described in any one of <13> to <16>, in which a content of a photopolymerization initiator in the active energy ray curable-type ink is less than 1% by mass with respect to a total amount of the active energy ray curable-type ink, and
  the active energy ray A is an electron beam.

<18> The manufacturing method of an article with a recorded image described in any one of <13> to <17>, further including a semi-curing step which is performed between the ink applying step and the curing step A after the ink applying step and is a step of semi-curing the active energy ray curable-type ink applied on the substrate by irradiation with an active energy ray P having irradiation energy lower than irradiation energy of the active energy ray A,
  in which the curing step A is a step of curing the semi-cured active energy ray curable-type ink by irradiation with the active energy ray A to obtain the image.

<19> The manufacturing method of an article with a recorded image described in any one of <13> to <18>, in which the ink applying step is a step of applying the active energy ray curable-type ink on the substrate by a single-pass ink jet method.

<20> The manufacturing method of an article with a recorded image described in any one of <13> to <19>, further including a step of applying an undercoat liquid on the substrate and semi-curing the applied undercoat liquid before the ink applying step to form an undercoat layer,
  in which the undercoat liquid contains polymerizable compounds but does not contain scale-like metal particles, the polymerizable compounds contained in the undercoat liquid include at least one of a monofunctional polymerizable compound or a bifunctional polymerizable compound, a total proportion of the monofunctional polymerizable compound and the bifunctional polymerizable compound in the polymerizable compounds contained in the undercoat liquid is 50% by mass or more, the ink applying step is a step of applying the active energy ray curable-type ink on the undercoat layer formed on the substrate.

<21> The manufacturing method of an article with a recorded image described in any one of <13> to <20>, further including a step of applying an overcoat liquid on the image and curing the applied overcoat liquid before the curing step A to form an overcoat layer, the overcoat liquid contains polymerizable compounds and an organic solvent but does not contain scale-like metal particles, a proportion of a polymerizable compound having a weight-average molecular weight of 1,000 or more in the polymerizable compounds contained in the overcoat liquid is 50% by mass or more, and a content of the organic solvent is 50% by mass or more with respect to a total amount of the overcoat liquid.

According to the present disclosure, there are provided an article with a recorded image comprising an image which is a cured substance of an active energy ray curable-type ink containing polymerizable compounds and has excellent metallic glossiness, and to provide an active energy ray curable-type ink, an ink set, and a manufacturing method of an article with a recorded image that are suitable for manufacturing the article with a recorded image.

DESCRIPTION OF THE PREFERRED EMBODIMENTS

In the present disclosure, a range of numerical values described using "to" means a range including the numerical values listed before and after "to" as the lower limit and the upper limit.

In the present disclosure, in a case where there is a plurality of substances in a composition that corresponds to each component of the composition, unless otherwise specified, the amount of each component of the composition means the total amount of the plurality of substances present in the composition.

Regarding the ranges of numerical values described stepwise in the present disclosure, the upper limit or the lower limit described in a certain range of numerical values may be replaced with the upper limit or the lower limit of another range of numerical values described stepwise or replaced with the values shown in Examples.

In the present disclosure, the term "step" includes not only an independent step, but also a step that is not clearly distinguished from other steps as long as the step achieves the intended goal.

In the present disclosure, a combination of preferable aspects is a more preferable aspect.

In the present disclosure, "light" is a concept that includes active energy rays such as γ rays, β rays, electron beams, ultraviolet rays, and visible rays.

In the present disclosure, sometimes ultraviolet rays are called "ultra violet (UV) light".

In the present disclosure, "(meth)acrylate" is a concept that includes both the acrylate and methacrylate, "(meth) acryloyl group" is a concept that includes both the acryloyl group and methacryloyl group, and "(meth)acrylic acid" is a concept that includes both the acrylic acid and methacrylic acid.

In the present disclosure, "(poly)alkylene glycol" is a concept that includes alkylene glycol and polyalkylene glycol, "(poly)ethylene glycol" is a concept that includes ethylene glycol and polyethylene glycol, and "(poly)propylene glycol" is a concept that includes propylene glycol and polypropylene glycol.

[Article with Recorded Image]

The article with a recorded image of the present disclosure comprises a substrate and an image disposed on the substrate, in which the image is a cured substance of an active energy ray curable-type ink containing scale-like metal particles and polymerizable compounds, the scale-like metal particles contain indium and have an average equivalent circle diameter of 50 nm to 1,000 nm and an average aspect ratio, which is a ratio of the average equivalent circle diameter to an average thickness, of 5 to 100, and within a cross section of the image, an average angle formed between a longitudinal direction of the scale-like metal particles and a surface of the substrate is 300 or less in a region that is within a distance of 100 nm from a surface of the image, and an average angle formed between the longitudinal direction of the scale-like metal particles and the surface of the substrate is more than 300 in a region that is beyond a distance of 100 nm from the surface of the image.

As described above, in a case where an image having metallic glossiness is recorded using an active energy ray curable-type ink containing polymerizable compounds, sometimes further improvement of the metallic glossiness of the image is required.

Specifically, in a case where the scale-like metal particles in the ink are aluminum (Al) particles in the aforementioned case, sometimes the metallic glossiness of the image is insufficient.

Furthermore, in a case where the scale-like metal particles in the ink are silver (Ag) particles in the aforementioned case, the Ag particles easily go through a chemical reaction such as oxidation or sulfidation, which sometimes makes the metallic glossiness (particularly, durable metallic glossiness) of the image insufficient.

Regarding these points, the article with a recorded image of the present disclosure comprises an image which is a cured substance of an active energy ray curable-type ink containing polymerizable compounds, and the image has excellent metallic glossiness.

The reason why the above effect is obtained is unclear. Presumably, the constitution in which within a cross section of the image, an average angle formed between the longitudinal direction of the scale-like metal particles and the surface of the substrate is 300 or less (roughly speaking, the scale-like metal particles are aligned substantially parallel to the surface of the substrate) in a region that is within a distance of 100 nm from the surface of the image (hereinafter, also called "surface layer portion of the image"), and the constitution in which within the cross section of the image, an average angle formed between the longitudinal direction of the scale-like metal particles and the surface of the substrate is more than 30° (roughly speaking, the scale-like metal particles are randomly arranged without being in alignment) in a region that is beyond a distance of 100 nm from the surface of the image (hereinafter, also called "inner portion of the image")

may contribute to the above effect.

Presumably, in the image having the above constitutions, light may be reflected by the scale-like metal particles aligned substantially parallel to the substrate in the surface layer portion of the image, and transmission of light may be suppressed by the scale-like metal particles randomly arranged in the inner portion of the image. It is considered that these effects in the surface layer portion of the image and the inner portion of the image may synergistically bring about the effect of metallic glossiness of the image.

In the present disclosure, a cross section of an image means a cross section of the image in a thickness direction (that is, a cut section obtained by cutting the image along a plane perpendicular to the surface of the substrate).

In the present disclosure, a longitudinal direction of scale-like metal particles is the direction of a long side of a rectangle that has the minimum area in a case where the exterior of each of the scale-like metal particles is surrounded by the rectangle (that is, the smallest circumscribed rectangle) within the cross section of the image.

Compared to scale-like metal particles containing Al or Ag, the scale-like metal particles containing indium (In) more effectively improve the metallic glossiness of an image. Presumably, compared to scale-like metal particles containing Al or Ag, the scale-like metal particles containing In are more likely to be arranged in the surface layer portion of the image such that the average angle formed between the longitudinal direction of the scale-like metal particles and the surface of the substrate is 300 or less, which may be the reason why the above effect is obtained.

Hereinafter, each element in the article with a recorded image of the present disclosure will be described.

<Substrate>

The article with a recorded image of the present disclosure comprises a substrate.

The substrate may be a permeable substrate, such as paper, or an impermeable substrate.

The article with a recorded image of the present disclosure comprises an image as a cured substance of an active energy ray curable-type ink. Therefore, even in a case where the substrate is an impermeable substrate, it is easy to secure the adhesiveness between the substrate and the image. Accordingly, the article with a recorded image of the present disclosure is particularly suitable as an article with a recorded image comprising an impermeable substrate as a substrate.

(Impermeable Substrate)

In the present disclosure, an impermeable substrate refers to a substrate having a water absorption rate (% by mass, 24 hr.) less than 0.2 in ASTM D570 which is the ASTM test method.

In the present disclosure, a permeable substrate refers to a substrate having a water absorption rate (% by mass, 24 hr.) of 0.2 or more in ASTM D570 which is the ASTM test method.

Examples of the impermeable substrate include glass, quartz, a plastic film, and leather.

Examples of resins constituting the plastic film include cellulose diacetate, cellulose triacetate, cellulose propionate, cellulose butyrate, cellulose acetate butyrate, cellulose nitrate, an acrylic resin, a chlorinated polyolefin resin, a polyether sulfone resin, polyethylene terephthalate (PET), polyethylene naphthalate, nylon, polyethylene, polystyrene (PS), polypropylene (PP), a polycycloolefin resin, a polyimide resin, a polycarbonate (PC) resin, and polyvinyl acetal.

The plastic film may be a film containing only one of these resins or a film containing two or more of these resins.

Examples of the leather include natural leather (also called "real leather"), synthetic leather (for example, polyvinyl chloride (PVC) leather or polyurethane (PU) leather), and the like. For the leather, for example, paragraphs "0163" to "0165" of JP2009-058750A can be referred to.

The thickness of the impermeable substrate is not particularly limited, but is preferably 10 µm to 2,000 µm, more preferably 20 µm to 1,000 µm, even more preferably 30 µm to 500 µm, and particularly preferably 30 µm to 400 µm.

(Permeable Substrate)

In the present disclosure, a permeable substrate refers to a substrate having a water absorption rate (% by mass, 24 hr.) of 0.2 or more in ASTM D570 which is the ASTM test method.

Examples of the permeable substrate include paper and cloth.

Examples of the paper include uncoated paper (for example, high-quality paper or the like), coated paper, paperboard, liner paper used for a corrugated cardboard, cloth, and the like. The paperboard may be provided with a coating layer.

As the permeable substrate, coated paper and a paperboard provided with a coating layer are preferable. An ink slowly permeates into the coated paper or the paperboard provided with a coating layer. Accordingly, the metallic glossiness of an image recorded on the coated paper or the paperboard is likely to be more strongly expressed.

<Image>

The article with a recorded image of the present disclosure comprises an image disposed on the substrate.

The image may be disposed on the substrate, in contact with the substrate or via another layer (for example, an undercoat layer).

In the present disclosure, "image" means general films formed using an ink, and "image recording" means the formation of an image (that is, a film).

In the present disclosure, the concept of "image" also includes a solid image.

The thickness of the image is preferably 0.2 µm to 50 µm, more preferably 0.5 µm to 30 µm, and even more preferably 1 µm to 10 µm.

(Cross Section of Image)

In the present disclosure, the average angle formed between the longitudinal direction of the scale-like metal particles and the surface of the substrate in the surface layer portion of the image (that is, a region that is within a distance of 100 nm from the surface of the image) within the cross section of the image and the average angle formed between the longitudinal direction of the scale-like metal particles and the surface of the substrate in the inner portion of the image (that is, a region that is beyond a distance of 100 nm from the surface of the image) within the cross section of the image are as described above.

The average angle formed between the longitudinal direction of the scale-like metal particles and the surface of the substrate in the surface layer portion of the image within the cross section of the image is determined by observing the cross section of the image with a scanning electron microscope (SEM) (for example, Nova 200 FIB-SEM manufactured by Thermo Fisher Scientific Inc.) at 50,000× magnification.

Specifically, 100 scale-like metal particles are selected from an SEM image, and for each of the selected scale-like metal particles, an angle formed between the longitudinal direction of the scale-like metal particle and the surface of the substrate is measured.

The angle formed between the longitudinal direction of the scale-like metal particle and the surface of the substrate means an angle defined in a range of 0° or more and 900 or less.

For the 100 scale-like metal particles, the angle formed between the longitudinal direction of each of the scale-like metal particles and the surface of the substrate is determined, and the simple average (arithmetic mean) of the obtained results is calculated to determine the average angle formed between the longitudinal direction of the scale-like metal particles and the surface of the substrate.

In the present disclosure, the average angle formed between the longitudinal direction of the scale-like metal particles and the surface of the substrate in the inner portion of the image (that is, a region that is within a distance of 100 nm from the surface of the image) within the cross section of the image is determined in the same manner as the average angle formed between the longitudinal direction of the scale-like metal particles and the surface of the substrate in the surface layer portion of the image within the cross section of the image, except that the site to be observed is changed to the inner portion of the image.

From the viewpoint of further improving the metallic glossiness of the image, the aforementioned average angle in the surface layer portion of the image is preferably 25° or less, more preferably 20° or less, even more preferably 15° or less, and still more preferably 10° or less.

The lower limit of the average angle in the surface layer portion of the image may be 0°.

From the viewpoint of further improving the metallic glossiness of the image, the aforementioned average angle in the inner portion of the image is preferably 35° or more, more preferably 40° or more, and even more preferably 45° or more.

The average angle in the inner portion of the image may be 90°.

(Components of Image)

The image is a cured substance of an active energy ray curable-type ink containing scale-like metal particles and polymerizable compounds.

The image is formed by irradiation of the active energy ray curable-type ink applied on a substrate with an active energy ray to polymerize the polymerizable compounds in the active energy ray curable-type ink. In this case, the scale-like metal particles remain in the image without going through a shape change.

In addition, by the polymerization, the polymerizable compounds are converted into a resin (polymer) and remains as it is in the image.

The scale-like metal particles contain indium and have an average equivalent circle diameter of 50 nm to 1,000 nm and an average aspect ratio, which is a ratio of the average equivalent circle diameter to an average thickness, of 5 to 100.

Preferred aspects of the scale-like metal particles will be described in the section of "Active energy ray curable-type ink" that will be described later.

As described above, the image contains scale-like metal particles and a resin derived from polymerizable compounds.

The image may contain other components as necessary.

For those other components, what are described in the section of "Active energy ray curable-type ink" that will be described later can be referred to as appropriate.

[Active Energy Ray Curable-Type Ink]

The active energy ray curable-type ink of the present disclosure (hereinafter, also simply called "ink of the present disclosure") contains scale-like metal particles and polymerizable compounds.

The scale-like metal particles contain indium and have an average equivalent circle diameter of 50 nm to 1,000 nm and an average aspect ratio, which is a ratio of the average equivalent circle diameter to an average thickness, of 5 to 100.

The ink of the present disclosure is suitable for manufacturing the article with a recorded image of the present disclosure.

<Scale-Like Metal Particles>

The ink contains at least one kind of scale-like metal particles.

The scale-like metal particles contain indium (In).

The scale-like metal particles may contain a metal element other than In.

In the scale-like metal particles, the amount of In with respect to the total amount of metal elements is preferably 50% by mass or more, more preferably 60% by mass or more, and even more preferably 80% by mass or more.

The scale-like metal particles may contain nonmetallic elements (for example, oxygen (O), nitrogen (N), carbon (C), and the like).

The amount of metal elements with respect to the total amount of the scale-like metal particles is preferably 50% by mass or more, more preferably 60% by mass or more, and even more preferably 80% by mass or more.

(Average Equivalent Circle Diameter)

The average equivalent circle diameter of the scale-like metal particles is 50 nm to 1,000 nm.

In a case where the average equivalent circle diameter is 50 nm or more, the metallic glossiness of the image is improved.

In a case where the average equivalent circle diameter is 1,000 nm or less, the stability of the ink used for recording the image is improved. Therefore, in a case where the ink is used as an ink jet ink, the jettability of the ink from an ink jet head is improved.

The average equivalent circle diameter is preferably 100 nm to 800 nm, and more preferably 200 nm to 600 nm.

(Average Aspect Ratio)

The average aspect ratio, which is a ratio of an average equivalent circle diameter to an average thickness, of the scale-like metal particles is 5 to 100.

In a case where the average aspect ratio is 5 or more, the metallic glossiness of the image is improved.

In a case where the average aspect ratio is 100 or less, the manufacturing suitability (that is, ease of manufacturing) of the scale-like metal particles is improved.

The average aspect ratio is preferably 5 to 50, and more preferably 5 to 20.

In the present disclosure, each of the average equivalent circle diameter and the average thickness of the scale-like metal particles means a value measured as follows.

As a liquid sample, a scale-like metal particle dispersion is prepared which contains scale-like metal particles as a dispersoid and propylene glycol monomethyl ether (PGME) as a dispersion medium (concentration of the scale-like metal particles is 20% by mass).

This liquid sample is applied on a PET film to obtain a coating film.

The surface of the coating film is observed with a scanning electron microscope (SEM) (for example, Nova 200 FIB-SEM manufactured by Thermo Fisher Scientific Inc., the same shall be applied hereinbelow), 50 scale-like metal particles are selected from the obtained SEM image, and the equivalent circle diameter of each of the scale-like metal particles is measured. The arithmetic mean of the equivalent circle diameters of the 50 scale-like metal particles is calculated and adopted as the average equivalent circle diameter of the scale-like metal particles.

The cross section of the aforementioned coating film is observed with SEM, 50 scale-like metal particles are selected from the obtained SEM image, and the thickness of each of the scale-like metal particles is measured. The arithmetic mean of the thicknesses of the 50 scale-like metal particles is calculated and adopted as the average thickness of the scale-like metal particles.

(Average Thickness)

The average thickness of the scale-like metal particles is preferably 10 nm to 50 nm.

In a case where the average thickness of the scale-like metal particles is within the above range, the metallic glossiness of the image is further improved.

The average thickness of the scale-like metal particles is more preferably 15 nm to 45 nm, and even more preferably 20 nm to 40 nm.

There is no particular limitation on the shape of the scale-like metal particles, as long as the particles are in the form of scales. Examples of the planar shape of the scale-like metal particles include a polygonal shape, an elliptical shape, an amorphous shape, and the like.

The scale-like metal particles are preferably flakes peeled from a metal film containing indium.

The scale-like metal particles of this aspect are preferably formed by forming a metal film containing indium on a substrate and peeling the formed metal film from the substrate. Examples of a method of forming the metal film containing indium include vapor deposition, sputtering, and the like. After peeled off, the metal film may be subjected to classification as necessary.

In preparing the ink, a scale-like metal particle dispersion may be used.

As the scale-like metal particle dispersion, a commercially available product, a concentrate of a commercially available product, a product prepared from a commercially available product by changing a solvent, a product prepared from a commercially available product by changing at least a part of dispersion medium into a polymerizable monomer, and the like may be used.

Examples of the commercially available product of the scale-like metal particle dispersion include an indium particle dispersion (for example, LeafPowder (registered trademark) 49CJ-1120) in the LeafPowder (registered trademark) series manufactured by OIKE & Co., Ltd.

The content of the scale-like metal particles with respect to the amount of total solid content of the ink is preferably 0.5% by mass to 30% by mass, and more preferably 1% by mass to 25% by mass.

In the present disclosure, the amount of total solid content of the ink means the amount of all components excluding solvents.

In the present disclosure, a preferred range of the content of a certain component with respect to the amount of total solid content of the ink is the same as the preferred range of a content of a certain component with respect to the total amount of the image.

<Polymerizable Compound>

The ink contains at least one polymerizable compound.

The polymerizable compound is a compound having a polymerizable group.

As the polymerizable group, a radically polymerizable group or a cationically polymerizable group is preferable, and a radically polymerizable group is more preferable.

The polymerizable compound may have only one polymerizable group or two or more polymerizable groups.

As the polymerizable compound, a radically polymerizable compound (that is, a compound having a radically polymerizable group) is preferable.

The radically polymerizable group is preferably an ethylenically unsaturated group, more preferably at least one polymerizable group selected from the group consisting of a (meth)acryloyl group, an allyl group, a styryl group, and a vinyl group, and even more preferably a (meth)acryloyl group.

Examples of the cationically polymerizable group include an epoxy group, an oxetanyl group, and the like.

The polymerizable compound may be a polymerizable monomer, a polymerizable polymer, or a combination of a polymerizable monomer and a polymerizable polymer.

The polymerizable monomer means a polymerizable compound having a molecular weight less than 1,000, and the polymerizable polymer means a polymerizable compound having a weight-average molecular weight (Mw) of 1,000 or more. The concept of "polymerizable polymer" in the present disclosure also includes so-called oligomers.

The weight-average molecular weight (Mw) of the polymerizable compound is preferably 30,000 or less, more preferably 20,000 or less, and even more preferably 10,000 or less.

Examples of the lower limit of Mw of the polymerizable compound include 50, 60, 70, and the like.

In the present disclosure, the weight-average molecular weight (Mw) means a value measured by gel permeation chromatography (GPC).

For the measurement by gel permeation chromatography (GPC), HLC (registered trademark)-8020GPC (manufactured by TOSOH CORPORATION) is used as a measuring device, three TSKgel (registered trademark) Super Multi-pore HZ-H (4.6 mm ID×15 cm, manufactured by TOSOH CORPORATION) columns are used as columns, and tetrahydrofuran (THF) is used as an eluent. The measurement is performed using an RI detector under the conditions of a sample concentration of 0.45% by mass, a flow rate of 0.35 ml/min, a sample injection amount of 10 μL, and a measurement temperature of 40° C.

The calibration curve is plotted from 8 samples of "Standard sample TSK standard, polystyrene" manufactured by TOSOH CORPORATION: "F-40", "F-20", "F-4", "F-1", "A-5000", "A-2500", "A-1000", and "n-propylbenzene".

The polymerizable compound may be a monofunctional polymerizable compound or a polyfunctional polymerizable compound (that is, a polymerizable compound having 2 or more functional groups).

The monofunctional polymerizable compound means a compound containing only one polymerizable group in one molecule, and the polyfunctional polymerizable compound means a compound containing two or more polymerizable groups in one molecule.

(Monofunctional Polymerizable Compound)

Examples of the monofunctional polymerizable compound include monofunctional (meth)acrylate, monofunctional (meth)acrylamide, a monofunctional aromatic vinyl compound, monofunctional vinyl ether, and a monofunctional N-vinyl compound.

Examples of the monofunctional (meth)acrylate include methyl (meth)acrylate, ethyl (meth)acrylate, propyl (meth)acrylate, n-butyl (meth)acrylate, hexyl (meth)acrylate, 2-ethylhexyl (meth)acrylate, tert-octyl (meth)acrylate, isoamyl (meth)acrylate, decyl (meth)acrylate, isodecyl (meth)acrylate, lauryl (meth)acrylate, stearyl (meth)acrylate, isostearyl (meth)acrylate, cyclohexyl (meth)acrylate, 4-n-butylcyclohexyl (meth)acrylate, 4-tert-butylcyclohexyl (meth)acrylate, bornyl (meth)acrylate, isobornyl (meth)acrylate, 2-ethylhexyldiglycol (meth)acrylate, butoxyethyl (meth)acrylate, 2-chloroethyl (meth)acrylate, 4-bromobutyl (meth)acrylate, cyanoethyl (meth)acrylate, benzyl (meth)acrylate, butoxymethyl (meth)acrylate, 3-methoxybutyl (meth)acrylate, 2-(2-methoxyethoxy)ethyl (meth)acrylate, 2-(2-butoxyethoxy)ethyl (meth)acrylate, ethyl carbitol (meth)acrylate, 2,2,2-tetrafluoroethyl (meth)acrylate, 1H,1H,2H,2H-perfluorodecyl (meth)acrylate, 4-butylphenyl (meth)acrylate, phenyl (meth)acrylate, 2,4,5-tetramethylphenyl (meth)acrylate, 4-chlorophenyl (meth)acrylate, 2-phenoxymethyl (meth)acrylate, 2-phenoxyethyl (meth)acrylate, glycidyl (meth)acrylate, glycidyloxybutyl (meth)acrylate, glycidyloxyethyl (meth)acrylate, glycidyloxypropyl (meth)acrylate, tetrahydrofurfuryl (meth)acrylate, 2-hydroxyethyl (meth)acrylate, 3-hydroxypropyl (meth)acrylate, 2-hydroxypropyl (meth)acrylate, 2-hydroxybutyl (meth)acrylate, 3-hydroxybutyl (meth)acrylate, 4-hydroxybutyl (meth)acrylate, cyclic trimethylolpropane formal (meth)acrylate, phenylglycidyl ether (meth)acrylate, dimethylaminoethyl (meth)acrylate, diethylaminoethyl (meth)acrylate, dimethylaminopropyl (meth)acrylate, diethylaminopropyl (meth)acrylate, trimethoxysilylpropyl (meth)acrylate, trimethylsilylpropyl (meth)acrylate, polyethylene oxide monomethyl ether (meth)acrylate, polyethylene oxide (meth)acrylate, polyethylene oxide monoalkyl ether (meth)acrylate, dipropylene glycol (meth)acrylate, polypropylene oxide monoalkyl ether (meth)acrylate, 2-methacryloyloxyethyl succinate, 2-methacryloyloxyhexahydrophthalic acid, 2-methacryloyloxyethyl-2-hydroxypropyl phthalate, butoxydiethylene glycol (meth)acrylate, trifluoroethyl (meth)acrylate, perfluorooctylethyl (meth)acrylate, 2-hydroxy-3-phenoxypropyl (meth)acrylate, ethylene oxide (EO)-modified phenol (meth)acrylate, EO-modified cresol (meth)acrylate, EO-modified nonylphenol (meth)acrylate, propylene oxide (PO)-modified nonylphenol (meth)acrylate, EO-modified-2-ethylhexyl (meth)acrylate, dicyclopentenyl (meth)acrylate, dicyclopentenyloxyethyl (meth)acrylate, dicyclopentanyl (meth)acrylate, (3-ethyl-3-oxetanylmethyl) (meth)acrylate, phenoxyethylene glycol (meth)acrylate, and the like.

Examples of the monofunctional (meth)acrylamide include (meth)acrylamide, N-methyl (meth)acrylamide, N-ethyl (meth)acrylamide, N-propyl (meth)acrylamide, N-n-butyl (meth)acrylamide, N-t-butyl (meth)acrylamide, N-butoxymethyl (meth)acrylamide, N-isopropyl (meth)acrylamide, N-methylol (meth)acrylamide, N,N-dimethyl (meth)acrylamide, N,N-diethyl (meth)acrylamide, (meth)acryloylmorpholine, and the like.

Examples of the monofunctional aromatic vinyl compound include styrene, dimethylstyrene, trimethylstyrene, isopropylstyrene, chloromethylstyrene, methoxystyrene, acetoxystyrene, chlorostyrene, dichlorostyrene, bromostyrene, vinyl benzoic acid methyl ester, 3-methylstyrene, 4-methylstyrene, 3-ethylstyrene, 4-ethylstyrene, 3-propylstyrene, 4-propylstyrene, 3-butylstyrene, 4-butylstyrene, 3-hexylstyrene, 4-hexylstyrene, 3-octylstyrene, 4-octylstyrene, 3-(2-ethylhexyl)styrene, 4-(2-ethylhexyl)styrene, allyl styrene, isopropenyl styrene, butenyl styrene, octenyl styrene, 4-t-butoxycarbonyl styrene, and 4-t-butoxystyrene.

Examples of the monofunctional vinyl ether include methyl vinyl ether, ethyl vinyl ether, propyl vinyl ether, n-butyl vinyl ether, t-butyl vinyl ether, 2-ethylhexyl vinyl ether, n-nonyl vinyl ether, lauryl vinyl ether, cyclohexyl vinyl ether, cyclohexyl methyl vinyl ether, 4-methylcyclohexyl methyl vinyl ether, benzyl vinyl ether, dicyclopentenyl vinyl ether, 2-dicyclopentenoxyethyl vinyl ether, methoxyethyl vinyl ether, ethoxyethyl vinyl ether, butoxyethyl vinyl ether, methoxyethoxyethyl vinyl ether, ethoxyethoxyethyl vinyl ether, methoxypolyethylene glycol vinyl ether, tetrahydrofurfuryl vinyl ether, 2-hydroxyethyl vinyl ether, 2-hydroxypropyl vinyl ether, 4-hydroxybutyl vinyl ether, 4-hydroxymethylcyclohexylmethyl vinyl ether, diethylene glycol monovinyl ether, polyethylene glycol vinyl ether, chloroethyl vinyl ether, chlorobutyl vinyl ether, chloroethoxyethyl vinyl ether, phenylethyl vinyl ether, and phenoxypolyethylene glycol vinyl ether.

Examples of the monofunctional N-vinyl compound include N-vinylcaprolactam and N-vinylpyrrolidone.

The molecular weight of the monofunctional polymerizable compound is preferably 1,000 or less, more preferably 500 or less, even more preferably 300 or less, and still more preferably 210 or less.

Examples of the lower limit of the molecular weight of the monofunctional polymerizable compound include 50, 60, 70, and the like.

The monofunctional polymerizable compound preferably includes at least one of a monofunctional (meth)acrylate or a monofunctional N-vinyl compound.

(Polyfunctional Polymerizable Compound)

The polyfunctional polymerizable compound is a polymerizable compound having 2 or more functional groups.

—Bifunctional Polymerizable Compounds—

Examples of the bifunctional polymerizable compound include bifunctional (meth)acrylate, bifunctional vinyl ether, a bifunctional polymerizable compound containing a vinyl ether group and a (meth)acryloyl group, and the like.

Examples of the bifunctional (meth)acrylate include ethylene glycol di(meth)acrylate, diethylene glycol di(meth)acrylate, triethylene glycol di(meth)acrylate, propylene glycol di(meth)acrylate, dipropylene glycol di(meth)acrylate, tripropylene glycol di(meth)acrylate, polyethylene glycol di(meth)acrylate, polypropylene glycol di(meth)acrylate, butylene glycol di(meth)acrylate, tetraethylene glycol di(meth)acrylate, neopentyl glycol di(meth)acrylate, 3-methyl-1,5-pentanediol di(meth)acrylate, hexanediol di(meth)acrylate, heptanediol di(meth)acrylate, EO-modified neopentyl glycol di(meth)acrylate, PO-modified neopentyl glycol di(meth)acrylate, EO-modified hexanediol di(meth)acrylate, PO-modified hexanediol di(meth)acrylate, octanediol di(meth)acrylate, nonanediol di(meth)acrylate, decanediol di(meth)acrylate, dodecanediol di(meth)acrylate, 1,6-hexanediol di(meth)acrylate, glycerin di(meth)acrylate, pentaerythritol di(meth)acrylate, ethylene glycol diglycidyl ether di(meth)acrylate, diethylene glycol diglycidyl ether di(meth)acrylate, tricyclodecanedimethanol di(meth)acrylate, and the like.

Examples of the bifunctional vinyl ether include 1,4-butanediol divinyl ether, ethylene glycol divinyl ether, diethylene glycol divinyl ether, triethylene glycol divinyl ether, polyethylene glycol divinyl ether, propylene glycol divinyl ether, butylene glycol divinyl ether, hexanediol divinyl ether, 1,4-cyclohexanedimethanol divinyl ether, bisphenol A alkylene oxide divinyl ether, bisphenol F alkylene oxide divinyl ether, and the like.

Examples of the bifunctional polymerizable compound containing a vinyl ether group and a (meth)acryloyl group include 2-(2-vinyloxyethoxy)ethyl (meth)acrylate.

—Polymerizable Compound Having 3 or More Functional Groups—

Examples of the polymerizable compound having 3 or more functional groups include a (meth)acrylate having 3 or more functional groups, a vinyl ether having 3 or more functional groups, and the like.

Examples of the (meth)acrylate having 3 or more functional groups include trimethylolethane tri(meth)acrylate, trimethylolpropane tri(meth)acrylate, EO-modified trimethylolpropane tri(meth)acrylate, PO-modified trimethylolpropane tri(meth)acrylate, pentaerythritol tri(meth)acrylate, pentaerythritol tetra(meth)acrylate, dipentaerythritol tetra(meth)acrylate, dipentaerythritol penta(meth)acrylate, dipentaerythritol hexa(meth)acrylate, tri(meth)acryloyloxyethoxytrimethylolpropane, glycerin polyglycidyl ether poly(meth)acrylate, tris(2-acryloyloxyethyl) isocyanurate, and the like.

Examples of the vinyl ether having 3 or more functional groups include trimethylolethane trivinyl ether, trimethylolpropane trivinyl ether, ditrimethylolpropane tetravinyl ether, glycerin trivinyl ether, pentaerythritol tetravinyl ether, dipentaerythritol pentavinyl ether, dipentaerythritol hexavinyl ether, EO-modified trimethylolpropane trivinyl ether, PO-modified trimethylolpropane trivinyl ether, EO-modified ditrimethylolpropane tetravinyl ether, PO-modified ditrimethylolpropane tetravinyl ether, EO-modified pentaerythritol tetravinyl ether, PO-modified pentaerythritol tetravinyl ether, EO-modified dipentaerythritol hexavinyl ether, PO-modified dipentaerythritol hexavinyl ether, and the like.

(Urethane (meth)acrylate)

Examples of the polyfunctional polymerizable compound also include urethane (meth)acrylate.

The urethane (meth)acrylate is preferably a compound containing 2 or 3 (meth)acryloyl groups and at least 1 urethane bond.

Examples of the urethane (meth)acrylate include urethane (meth)acrylate which is a reactant of a bifunctional isocyanate compound and a hydroxyl group-containing (meth)acrylate (plus another active hydrogen group-containing compound as necessary).

Examples of the bifunctional isocyanate compound include aliphatic diisocyanates such as methylene diisocyanate, dimethylene diisocyanate, trimethylene diisocyanate, tetramethylene diisocyanate, pentamethylene diisocyanate, hexamethylene diisocyanate, dipropyl ether diisocyanate, 2,2-dimethylpentane diisocyanate, 3-methoxyhexane diisocyanate, octamethylene diisocyanate, 2,2,4-trimethylpentane diisocyanate, nonamethylene diisocyanate, decamethylene diisocyanate, 3-butoxyhexane diisocyanate, 1,4-butylene glycol dipropyl ether diisocyanate, and thiodihexyl diisocyanate;

aromatic diisocyanates such as m-phenylene diisocyanate, p-phenylene diisocyanate, 2,4-tolylene diisocyanate, 2,6-tolylene diisocyanate, dimethylbenzene diisocyanate, ethylbenzene diisocyanate, isopropylbenzene diisocyanate, tolidine diisocyanate, 1,4-naphthalene diisocyanate, 1,5-naphthalene diisocyanate, 2,6-naphthalene diisocyanate, 2,7-naphthalene diisocyanate, metaxylylene diisocyanate, paraxylylene diisocyanate, and tetramethylxylylene diisocyanate;

alicyclic diisocyanates such as hydrogenated xylylene diisocyanate, isophorone diisocyanate, and dicyclohexylmethane 4,4'-diisocyanate;

and the like.

Examples of the hydroxyl group-containing (meth)acrylate include 2-hydroxyethyl (meth)acrylate, 3-hydroxypropyl (meth)acrylate, 2-hydroxypropyl (meth)acrylate, 2-hydroxybutyl (meth)acrylate, 3-hydroxybutyl (meth)acrylate, 4-hydroxybutyl (meth)acrylate, phenylglycidyl ether (meth)acrylate, pentaerythritol tri(meth)acrylate, dipentaerythritol penta(meth)acrylate, and the like.

Examples of commercially available products of the urethane (meth)acrylate include CN996 (bifunctional urethane acrylate, weight-average molecular weight (Mw)=2,850) of Sartomer Company Inc., UA-122P (bifunctional urethane acrylate, Mw=1,100) of SHIN-NAKAMURA CHEMICAL CO., LTD., Shikoh (registered trademark) UV-6630B (bifunctional urethane acrylate, Mw=3,000), Shikoh (registered trademark) UV-3310B (bifunctional urethane acrylate, Mw=5,000), and Shikoh (registered trademark) UV-7630B (hexafunctional urethane acrylate, Mw=2,200) of NIHON GOSEI KAKO Co., Ltd., and the like.

(Silicone Compound Having Ethylenically Unsaturated Group)

Examples of the polyfunctional polymerizable compound also include a silicone compound having an ethylenically unsaturated group.

The silicone compound having an ethylenically unsaturated group is preferably silicone polyether acrylate, more preferably polyfunctional silicone polyether acrylate, and even more preferably silicone polyether acrylate having 5 or 6 functional groups.

(Epoxy (meth)acrylate)

Examples of the bifunctional polymerizable compound and the polymerizable compound having 3 or more functional groups described above also include epoxy (meth)acrylate.

The epoxy (meth)acrylate means a reaction product of a reaction between carboxy groups in a (meth)acrylic acid and 2 or 3 epoxy groups in an epoxy compound containing 2 or 3 epoxy groups.

Therefore, the structure of the epoxy (meth)acrylate has no epoxy group. This is the difference between the epoxy (meth)acrylate and the epoxy compound which is an example of the cationically polymerizable monomer described above.

Examples of the epoxy (meth)acrylate include a reactant of a (meth)acrylic acid and an epoxy resin.

Examples of the epoxy resin include a bisphenol A-type epoxy resin, a cresol novolac-type epoxy resin, and the like.

It is preferable that the polymerizable compounds contained in the ink include at least one of a monofunctional polymerizable compound or a bifunctional polymerizable compound.

In this case, the total proportion of the monofunctional polymerizable compound and the bifunctional polymerizable compound in the polymerizable compounds contained in the ink is preferably 50% by mass or more, more preferably 60% by mass or more, and even more preferably 80% by mass or more.

The total content of the monofunctional polymerizable compound and the bifunctional polymerizable compound is preferably 10% by mass or more with respect to the total amount of the ink.

The content of the polymerizable compounds in the ink varies depending on the type of polymerizable compounds contained in the ink. The content of the polymerizable compounds with respect to the total amount of the ink is preferably 10% by mass or more, and more preferably 20% by mass or more.

The content of the polymerizable compounds in the ink varies depending on the type of polymerizable compounds contained in the ink. The content of the polymerizable compounds with respect to the amount of total solid content of the ink (that is, total amount of the ink excluding solvents) is preferably 40% by mass or more, more preferably 50% by mass or more, and even more preferably 60% by mass or more.

<Organic Solvent>

It is preferable that the ink of the present disclosure contain at least one organic solvent.

The content of the organic solvent with respect to the total amount of the ink is preferably 1% by mass or more.

In a case where the content of the organic solvent is 1% by mass or more, the metallic glossiness of the image is further improved. Although the reason is unclear, presumably, the organic solvent of the above content may help the scale-like metal particles to be precipitated mainly on the surface of the image and/or in the vicinity of the surface of the image, which may improve the metallic glossiness of the image.

The upper limit of the content of the organic solvent with respect to the total amount of the ink is, for example, 90% by mass or less.

As the organic solvent, it is possible to use known organic solvents that can be used for ink. Examples of the known organic solvents include the organic solvents described in a new edition of "Solvent pocket book" (edited by The Society of Synthetic Organic Chemistry, Japan, published in 1994) and the like.

Examples of the organic solvent include (poly)alkylene glycol monoalkyl ethers such as ethylene glycol monoethyl ether, diethylene glycol monoethyl ether, triethylene glycol monomethyl ether, propylene glycol monomethyl ether (PGME), dipropylene glycol monomethyl ether, and tripropylene glycol monomethyl ether;

(poly)alkylene glycol dialkyl ethers such as ethylene glycol dibutyl ether, diethylene glycol dimethyl ether, diethylene glycol diethyl ether, dipropylene glycol diethyl ether, and tetraethylene glycol dimethyl ether;

(poly)alkylene glycol acetates such as diethylene glycol acetate;

(poly)alkylene glycol diacetates such as ethylene glycol diacetate and propylene glycol diacetate;

(poly)alkylene glycol monoalkyl ether acetates such as ethylene glycol monobutyl ether acetate and propylene glycol monomethyl ether acetate, ketones such as methyl ethyl ketone and cyclohexanone;

lactones such as γ-butyrolactone;

esters such as ethyl acetate, propyl acetate, butyl acetate, 3-methoxybutyl acetate (MBA), methyl propionate, and ethyl propionate;

cyclic ethers such as tetrahydrofuran and dioxane;

amides such as dimethylformamide and dimethylacetamide;

and the like.

The (poly)alkylene glycol is preferably (poly)ethylene glycol and/or (poly)propylene glycol.

In a case where the proportion of the polymerizable compound having a weight-average molecular weight of 1,000 or more in polymerizable compounds in the ink is 50% by mass or more, the content of the organic solvent with respect to the total amount of the ink is preferably 50% by mass or more (refer to the third aspect that will be described later). In a case where the content of the organic solvent is in this range, the jettability of the ink from an ink jet head (hereinafter, also simply called "jettability of the ink") is further improved.

In this case, the content of the organic solvent with respect to the total amount of the ink is more preferably 60% by mass or more, and even more preferably 70% by mass or more.

<Photopolymerization Initiator>

From the viewpoint of improving the sensitivity to ultraviolet rays, it is preferable that the ink of the present disclosure contain at least one photopolymerization initiator.

The photopolymerization initiator is preferably a radical polymerization initiator that generates radicals by being irradiated with light.

Examples of the radical polymerization initiator include (a) alkylphenone compound, (b) acylphosphine oxide compound, (c) aromatic onium salt compound, (d) organic peroxide, (e) thio compound (for example, a thioxanthone compound such as isopropylthioxanthone), (f) hexaarylbiimidazole compound, (g) ketoxime ester compound, (h) borate compound, (i) azinium compound, (j) metallocene compound, (k) active ester compound, (l) carbon halogen bond-containing compound, and (m) alkylamine compound.

It is preferable that the photopolymerization initiator contained in the ink include an acylphosphine oxide compound.

Examples of the acylphosphine oxide compound include bis(2,4,6-trimethylbenzoyl)phenylphosphine oxide, bis(2,6-dimethylbenzoyl)phenylphosphine oxide, bis(2,4,6-trimethylbenzoyl)-2-methoxyphenylphosphine oxide, bis(2,6-dimethylbenzoyl)-2-methoxyphenylphosphine oxide, bis(2,4,6-trimethylbenzoyl)-2,4-dimethoxyphenylphosphine oxide, bis(2,6)-dimethylbenzoyl)-2,4-dimethoxyphenylphosphine oxide, bis(2,4,6-trimethylbenzoyl)-2,4-dipentyloxyphenylphosphine oxide, bis(2,6-dimethylbenzoyl)-2,4-dipentyloxyphenylphosphine oxide, 2,4,6-trimethylbenzoylethoxyphenylphosphine oxide, 2,6-dimethylbenzoylethoxyphenylphosphine oxide, 2,4,6-trimethylbenzoylmethoxyphenylphosphine oxide, bis(2,6-dimethoxybenzoyl)-2,4,4-trimethylpentylphenylphosphine oxide, 2,4,6-trimethylbenzoyldiphenylphosphine oxide, 2,6-dimethylbenzoylmethoxyphenylphosphine oxide, 2,4,6-trimethylbenzoyl(4-pentyloxyphenyl)phenylphosphine oxide, 2,6-dimethylbenzoyl(4-pentyloxyphenyl)phenylphosphine oxide, and the like.

Among these, as the acylphosphine oxide compound, bis(2,4,6-trimethylbenzoyl)phenylphosphine oxide and 2,4,6-trimethylbenzoyldiphenylphosphine oxide are preferable, and bis(2,4,6-trimethylbenzoyl)phenylphosphine oxide is more preferable.

The radical polymerization initiator may be a low-molecular-weight photopolymerization initiator having a molecular weight less than 500 or a high-molecular-weight photopolymerization initiator having a molecular weight of 500 or more.

The molecular weight of the high-molecular-weight radical polymerization initiator is preferably 500 to 3,000, more preferably 700 to 2,500, and even more preferably 900 to 2,100.

For the high-molecular-weight radical polymerization initiator, the publications such as JP2017-105902A (paragraphs "0038" and the like) and JP2017-522364A (paragraphs "0017" to "0053") can be referred to.

Examples of commercially available products of the radical polymerization initiator include commercial low-molecular-weight radical polymerization initiators such as Omnirad TPO H, Omnirad 819, Omnirad 369, Omnirad 907, and Omnirad 2959 (manufactured by IGM Resins B. V.);

commercial high-molecular-weight radical polymerization initiators such as Omnipole 910, Omnipole TX, and Omnipole 9210 (manufactured by IGM Resins B. V.), Speedcure 7005, Speedcure 7010, Speedcure 7010L, and Speedcure 7040 (manufactured by Lambson Ltd.;

and the like.

The ink of the present disclosure may contain two or more photopolymerization initiators having different absorption wavelengths.

For example, in a manufacturing method X which is a manufacturing method of an article with a recorded image that will be described later, in a case where pinning exposure (semi-curing) by an active energy ray P (for example, long-wavelength ultraviolet light) and curing exposure (full curing) by an active energy ray A are performed in this order, the ink may contain a photopolymerization initiator P that readily absorbs the active energy ray P and a photopolymerization initiator A that readily absorbs the active energy ray A. According to this aspect, the metallic glossiness and sharpness of the image can be further improved.

The content of the photopolymerization initiators with respect to the total amount of the ink is preferably 1% by mass to 20% by mass, more preferably 2% by mass to 15% by mass, even more preferably 3% by mass to 10% by mass, and still more preferably 3% by mass to 8% by mass.

In a case where the content of the photopolymerization initiators is 1% by mass to 20% by mass, the rub resistance of the image is further improved.

On the other hand, in a case where the ink of the present disclosure is an ink that is cured by an electron beam as an active energy ray, the content of the photopolymerization initiators with respect to the total amount of the ink may be less than 1% by mass.

"The content of the photopolymerization initiators with respect to the total amount of the ink is less than 1% by mass" means that the ink does not contain a photopolymerization initiator or the content of the photopolymerization initiators is less than 1% by mass with respect to the total amount of the ink even though the ink contains photopolymerization initiators.

<Surfactant>

The ink may contain at least one surfactant.

Examples of the surfactant include the surfactants described in JP1987-173463A (JP-S62-173463A) and JP1987-183457A (JP-S62-183457A). Examples of the surfactant include anionic surfactants such as dialkyl sulfosuccinate, alkyl naphthalene sulfonate, and an fatty acid salts, nonionic surfactants such as polyoxyethylene alkyl ether, polyoxyethylene alkyl allyl ether, acetylene glycol, and a polyoxyethylene-polyoxypropylene block copolymer, and cationic surfactants such as an alkylamine salt and a quaternary ammonium salt. The surfactant may also be a fluorine-based surfactant or a silicone-based surfactant.

As the surfactant, a silicone-based surfactant (excluding the aforementioned silicone compound having an ethylenically unsaturated group) is preferable.

Examples of the silicone-based surfactant include a polysiloxane compound which is preferably a modified polysiloxane compound obtained by introducing an organic group into some of methyl groups of dimethylpolysiloxane. Examples of the modification include polyether modification, methylstyrene modification, alcohol modification, alkyl modification, aralkyl modification, fatty acid ester modification, epoxy modification, amine modification, amino modification, and mercapto modification. A plurality of types of organic groups may be introduced into some of the methyl groups of the dimethylpolysiloxane.

Among the above, from the viewpoint of jetting stability, a polyether-modified polysiloxane compound is preferable as the silicone-based surfactant.

Examples of the polyether-modified polysiloxane compound include SILWET L-7604, SILWET L-7607N, SILWET FZ-2104, and SILWET FZ-2161 (manufactured by Momentive Performance Materials Japan LLC.), BYK306, BYK307, BYK331, BYK333, BYK347, and BYK348 (manufactured by BYK-Chemie GmbH), and KF-351A, KF-352A, KF-353, KF-354L, KF-355A, KF-615A, KF-945, KF-640, KF-642, KF-643, KF-6020, X-22-6191, X-22-4515, KF-6011, KF-6012, KF-6015, and KF-6017 (manufactured by Shin-Etsu Chemical Co., Ltd.).

In a case where the ink contains a surfactant, the content of the surfactant with respect to the total amount of the ink is preferably 0.001% by mass to 4.0% by mass, more preferably 0.01% by mass to 3.0% by mass, and even more preferably 0.05% by mass to 2.0% by mass.

<Polymerization Inhibitor>

The ink may contain at least one polymerization inhibitor.

Examples of the polymerization inhibitor include p-methoxyphenol, quinones (for example, hydroquinone, benzoquinone, methoxybenzoquinone, and the like), phenothiazine, catechols, alkylphenols (for example, dibutylhydroxytoluene (BHT) and the like), alkylbisphenols, zinc dimethyldithiocarbamate, copper dimethyldithiocarbamate, copper dibutyldithiocarbamate, copper salicylate, thiodipropionic acid esters, mercaptobenzimidazole, phosphites, 2,2,6,6-tetramethylpiperidin-1-oxyl (TEMPO), 2,2,6,6-tetramethyl-4-hydroxypiperidin-1-oxyl (TEMPOL), a tris(N-nitroso-N-phenylhydroxylamine) aluminum salt (also known as cupferron Al), and the like.

Among these, at least one polymerization inhibitor selected from p-methoxyphenol, catechols, quinones, alkylphenols, TEMPO, TEMPOL, and a tris(N-nitroso-N-phenylhydroxylamine) aluminum salt is preferable, and at least one polymerization inhibitor selected from p-methoxyphenol, hydroquinone, benzoquinone, BHT, TEMPO, TEMPOL, and a tris(N-nitroso-N-phenylhydroxylamine) aluminum salt is more preferable.

In a case where the ink contains a polymerization inhibitor, the content of the polymerization inhibitor with respect to the total amount of the ink is preferably 0.01% by mass to 2.0% by mass, more preferably 0.02% by mass to 1.0% by mass, and particularly preferably 0.03% by mass to 0.5% by mass.

<Resin>

The ink may contain at least one resin.

Examples of the resin include an acrylic resin, a urethane resin, a polyester resin, a polyolefin resin, an amide resin, a cellulose resin, and the like.

The resin is preferably an acrylic resin.

The weight-average molecular weight of the resin is preferably 5,000 to 100,000, more preferably 10,000 to 100,000, and even more preferably 20,000 to 80,000.

The weight-average molecular weight of the resin is measured using GPC. The measurement conditions of GPC are as described above.

In a case where the ink contains a resin, the content of the resin with respect to the total amount of the ink is 1% by mass to 25% by mass, more preferably 3% by mass to 20% by mass, and even more preferably 5% by mass to 15% by mass.

<Dispersant>

The ink may contain at least one dispersant.

As the dispersant, a polymer dispersant is preferable.

"Polymer dispersant" means a dispersant having a weight-average molecular weight (Mw) of 1,000 or more.

Examples of the polymer dispersant include DISPERBYK-101, DISPERBYK-102, DISPERBYK-103, DISPERBYK-106, DISPERBYK-111, DISPERBYK-161, DISPERBYK-162, DISPERBYK-163, DISPERBYK-164, DISPERBYK-166, DISPERBYK-167, DISPERBYK-168, DISPERBYK-170, DISPERBYK-171, DISPERBYK-174, and DISPERBYK-182 (manufactured by BYK-Chemie GmbH); EFKA4010, EFKA4046, EFKA4080, EFKA5010, EFKA5207, EFKA5244, EFKA6745, EFKA6750, EFKA7414, EFKA745, EFKA7462, EFKA7500, EFKA7570, EFKA7575, EFKA7580, and EFKA7701 (manufactured by EFKA Additives B. V.); DISPERSE AID 6, DISPERSE AID 8, DISPERSE AID 15, and DISPERSE AID 9100 (manufactured by SAN NOPCO LIMITED); various SOLSPERSE dispersants (manufactured by Noveon) such as SOLSPERSE 3000, 5000, 9000, 12000, 13240, 13940, 17000, 22000, 24000, 26000, 28000, 32000, 36000, 39000, 41000, and 71000; ADEKA PLURONIC L31, F38, L42, L44, L61, L64, F68, L72, P95, F77, P84, F87, P94, L101, P103, F108, L121, and P-123 (manufactured by ADEKA CORPORATION), IONET S-20 (manufactured by SANYO CHEMICAL INDUSTRIES, LTD.); and DISPARLON KS-860, 873SN, and 874 (polymer dispersant), #2150 (aliphatic polyvalent carboxylic acid), and #7004 (polyether ester type) (manufactured by Kusumoto Chemicals, Ltd.).

In a case where the ink contains a dispersant, the content of the dispersant with respect to the total amount of the ink is preferably 0.05% by mass to 10% by mass, and more preferably 0.1% by mass to 5% by mass.

<Other Components>

As necessary, the ink of the present disclosure may contain other components in addition to the components described above.

Examples of those other components include colorants (for example, pigments and dyes), wax, antioxidants, antifading agents, conductive salts, basic compounds, and the like.

<Ink Jet Ink>

The ink of the present disclosure is preferably an ink jet ink.

Hereinafter, preferred physical properties in a case where the ink of the present disclosure is an ink jet ink will be described.

The surface tension of the ink of present disclosure is preferably 20 mN/m to 50 mN/m, and more preferably 28 mN/m to 50 mN/m.

In a case where the surface tension of the ink is 20 mN/m or more, the jettability of the ink is further improved.

In a case where the surface tension of the ink is 50 mN/m or less, the quality of the image is further improved.

The surface tension means a value measured at 25° C.

The surface tension can be measured using a surface tensiometer, for example, "Automatic Surface Tensiometer CBVP-Z (trade name, manufactured by Kyowa Interface Science Co., Ltd.)".

From the viewpoint of jettability of the ink, the viscosity of the ink of the present disclosure is preferably 5 mPa·s to 50 mPa·s, more preferably 10 mPa·s to 30 mPa·s, and even more preferably 10 mPa·s to 25 mPa·s.

The viscosity means a value measured at 25° C.

The viscosity can be measured using a viscometer, for example, VISCOMETER RE-85L (manufactured by TOKISANGYO).

Next, preferred aspects of the ink of the present disclosure will be described.

(First Aspect)

The ink according to a first aspect is an ink containing a polymerizable compound that includes a monofunctional polymerizable compound, in which a proportion of the monofunctional polymerizable compound in the polymerizable compound contained in the ink is 90% by mass or more.

The image recorded with the ink according to the first aspect is excellent in metallic glossiness, line quality, and stretchability and exhibits excellent metallic glossiness after stretching.

"Excellent in line quality" means that bleeding in a line image is suppressed.

Stretchability and metallic glossiness after stretching are properties that may be required in a case where the article with a recorded image is subjected to heat stretching (for example, vacuum molding) to manufacture a molded article (for example, a three-dimensional article). In a case where the image has low stretchability, sometimes the image is broken when the article with a recorded image is subjected to heat stretching.

Therefore, the article with a recorded image including an image which is a cured substance of the ink according to the first aspect is suitable as an article with a recorded image to be subjected to heat stretching (for example, vacuum molding) for manufacturing a molded article (for example, a three-dimensional article).

The three-dimensional article is not particularly limited, and examples thereof include various covers such as a cover for a smartphone and a cover for a vehicle; various packaging materials; a decorative film for home appliances and furniture; and the like.

In the ink according to the first aspect, the content of the monofunctional polymerizable compound with respect to the total amount of the ink is preferably 50% by mass, more preferably 60% by mass or more, and even more preferably 70% by mass or more.

It is preferable that the ink according to the first aspect contain an organic solvent, and the content of the organic solvent is preferably 1% by mass or more with respect to the total amount of the ink. In the ink according to the first aspect, the content of the organic solvent with respect to the total amount of the ink is preferably 10% by mass or less, and more preferably 5% by mass or less.

It is preferable that the ink according to the first aspect contain a resin.

(Second Aspect)

The ink according to a second aspect is an ink containing a polymerizable compound that includes a polyfunctional polymerizable compound, in which a proportion of the polyfunctional polymerizable compound in the polymerizable compound contained in the ink is 60% by mass or more.

The image recorded with the ink according to the second aspect is excellent in metallic glossiness, line quality, and elution resistance.

The elution resistance means the properties that prevent low-molecular-weight components in the image from being easily eluted in water or an organic solvent.

The article with a recorded image comprising an image which is a cured substance of the ink according to the second aspect is suitable as, for example, a packaging material for food.

In the ink according to the second aspect, the content of the bifunctional polymerizable compound with respect to the total amount of the ink is preferably 50% by mass, more preferably 60% by mass or more, and even more preferably 70% by mass or more.

It is preferable that the ink according to the second aspect contain an organic solvent, and the content of the organic solvent is preferably 1% by mass or more with respect to the total amount of the ink. In the ink according to the second aspect, the content of the organic solvent with respect to the total amount of the ink is preferably 10% by mass or less, and more preferably 5% by mass or less.

(Third Aspect)

The ink according to a third aspect is an ink containing a polymerizable compound that includes a polymerizable compound having a weight-average molecular weight of 1,000 or more, in which a proportion of the polymerizable compound having a weight-average molecular weight of 1,000 or more in the polymerizable compound contained in the ink is 50% by mass or more.

The image recorded with the ink according to the third aspect is excellent in metallic glossiness, line quality, and rub resistance.

Further, because the amount of the polymerizable compound, which has a weight-average molecular weight of 1,000 or more, contained in the ink is as described above, the distance between crosslinking points may increase in the cured ink (that is, the image), which could bring about an effect of improving the flexibility of the image (for example, the conformity of the image to bending deformation of the substrate).

Therefore, the article with a recorded image comprising an image which is a cured substance of the ink according to the third aspect is suitable as an article with a recorded image comprising a flexible substrate (for example, leather).

Examples of the article with a recorded image include leather products (for example, seats for vehicles, bags, shoes, wallets, and the like).

The proportion of the polymerizable compound having a weight-average molecular weight of 1,000 or more in the polymerizable compounds contained in the ink is more preferably 60% by mass or more, and even more preferably 80% by mass or more.

The upper limit of Mw of the polymerizable compound having a weight-average molecular weight (Mw) of 1,000 or more is preferably 30,000 or less, more preferably 20,000 or less, and even more preferably 10,000 or less.

It is preferable that the ink according to the third aspect contain an organic solvent, and the content of the organic solvent is preferably 50% by mass or more with respect to the total amount of the ink. In a case where the content of the organic solvent is in this range, the jettability of the ink is further improved.

In the ink according to the third aspect, the content of the organic solvent is preferably 90% by mass or less with respect to the total amount of the ink.

[Ink Set]

The ink set of the present disclosure comprises
the ink of the present disclosure described above (that is, the active energy ray curable-type ink of the present disclosure) and
at least one of an undercoat liquid or an overcoat liquid.

The ink set of the present disclosure comprises the ink of the present disclosure described above.

Therefore, the ink set of the present disclosure is also suitable for manufacturing the article with a recorded image of the present disclosure.

The undercoat liquid is a liquid that is applied on the substrate before the ink of the present disclosure is applied, and is for forming an undercoat layer. The application of the undercoat liquid makes it possible to manufacture an article with a recorded image comprising an undercoat layer between an image and a substrate. The article with a recorded image comprising the undercoat layer can form a high-definition image. In addition, in such an article with a recorded image, the adhesiveness between the image and the substrate is further improved.

The overcoat liquid (hereinafter, also called "OC liquid") is a liquid that is applied on the image recorded with the ink of the present disclosure and is for forming an overcoat layer (hereinafter, also called "OC layer"). The OC layer is formed at least on the image. The OC layer may be formed to straddle the image and a region where no image is formed. The image in the article with a recorded image comprising the OC layer has higher rub resistance.

Hereinafter, the undercoat liquid and the overcoat liquid will be more specifically described.

<Undercoat Liquid>

The undercoat liquid contains polymerizable compounds but does not contain scale-like metal particles, the polymerizable compounds contained in the undercoat liquid include at least one of a monofunctional polymerizable compound or a bifunctional polymerizable compound, and a total proportion of the monofunctional polymerizable compound and the bifunctional polymerizable compound in the polymerizable compounds contained in the undercoat liquid is 50% by mass or more.

Specific examples of the polymerizable compounds contained in the undercoat liquid are the same as the specific examples of the polymerizable compounds contained in the ink.

The undercoat liquid may contain other components (for example, a photopolymerization initiator) in addition to the polymerizable compounds.

For those other components contained in addition to the polymerizable compounds, the components in the ink of the present disclosure can be referred to.

It is preferable that the undercoat liquid substantially do not contain a colorant (for example, a pigment).

Specifically, the content of the colorant is preferably less than 1% by mass with respect to the total amount of the undercoat liquid.

Hereinafter, preferred aspects of the undercoat liquid will be described.

(Aspect A)

The undercoat liquid according to an aspect A is an undercoat liquid that contains a monofunctional polymerizable compound, in which a proportion of the monofunctional polymerizable compound in the polymerizable compounds contained in the undercoat liquid is 90% by mass or more.

In the ink set of the present disclosure, one of the examples of preferred combinations of the ink and the undercoat liquid is a combination of the ink according to the first aspect and the undercoat liquid according to the aspect A.

(Aspect B)

The undercoat liquid according to an aspect B is an undercoat liquid that contains a polyfunctional polymerizable compound, in which a proportion of the polyfunctional polymerizable compound in the polymerizable compounds contained in the undercoat liquid is 60% by mass or more.

In the ink set of the present disclosure, one of the examples of preferred combinations of the ink and the undercoat liquid is a combination of the ink according to the second aspect and the undercoat liquid according to the aspect B.

The content of the polymerizable compounds with respect to the total amount of the undercoat liquid according to the aspect B is preferably 10% by mass to 90% by mass, more preferably 20% by mass to 80% by mass, even more preferably 30% by mass to 70% by mass, and still more preferably 40% by mass to 60% by mass.

—Isocyanate Compound—

It is preferable that the undercoat liquid according to the aspect B contain at least one isocyanate compound.

The isocyanate compound is not particularly limited as long as it is a compound having an isocyanate group. From the viewpoint of improving curing properties, the isocyanate compound is preferably a polyfunctional isocyanate compound having two or more isocyanate groups in one molecule.

The undercoat liquid according to the aspect B may be separately prepared as a part A containing polymerizable compounds and a part B containing an isocyanate compound.

In this case, the part A and the part B can be mixed together immediately before being applied to the substrate and can be applied to the substrate as the undercoat liquid according to the aspect B.

Examples of the bifunctional isocyanate compound having two isocyanate groups in one molecule include aliphatic diisocyanates such as methylene diisocyanate, dimethylene diisocyanate, trimethylene diisocyanate, tetramethylene diisocyanate, pentamethylene diisocyanate, hexamethylene diisocyanate, dipropyl ether diisocyanate, 2,2-dimethylpentane diisocyanate, 3-methoxyhexane diisocyanate, octamethylene diisocyanate, 2,2,4-trimethylpentane diisocyanate, nonamethylene diisocyanate, decamethylene diisocyanate, 3-butoxyhexane diisocyanate, 1,4-butylene glycol dipropyl ether diisocyanate, and thiodihexyl diisocyanate;

aromatic diisocyanates such as m-phenylene diisocyanate, p-phenylene diisocyanate, 2,4-tolylene diisocyanate, 2,6-tolylene diisocyanate, dimethylbenzene diisocyanate, ethylbenzene diisocyanate, isopropylbenzene diisocyanate, tolidine diisocyanate, 1,4-naphthalene diisocyanate, 1,5-naphthalene diisocyanate, 2,6-naphthalene diisocyanate, 2,7-naphthalene diisocyanate, metaxylylene diisocyanate, paraxylylene diisocyanate, and tetramethylxylylene diisocyanate; and alicyclic diisocyanates such as hydrogenated xylylene diisocyanate, isophorone diisocyanate, and dicyclohexylmethane 4,4'-diisocyanate.

The isocyanate compound may be a biuret-type compound or an isocyanurate-type compound which is a trimer of a bifunctional isocyanate compound, an adduct of a polyol such as trimethylolpropane and a bifunctional isocyanate compound, or an adduct of an alcohol such as methanol and a bifunctional isocyanate compound.

As the isocyanate compound, from the viewpoint of adhesiveness between the substrate and the image, among the above, an aliphatic isocyanate compound is preferable, an aliphatic isocyanate compound having two or more isocyanate groups in one molecule is more preferable, an aliphatic diisocyanate, an isocyanurate-type compound of an aliphatic diisocyanate, an allophanate-type compound of an aliphatic diisocyanate and an alcohol, or an adduct-type compound of an aliphatic diisocyanate and a polyol is even more preferable, and an aliphatic diisocyanate or an isocyanurate-type compound of an aliphatic diisocyanate is particularly preferable.

The isocyanate compound may be a commercially available product on the market.

The isocyanate compound may be a commercially available product on the market.

Examples of commercially available products of an isocyanate compound having 3 or more functional groups that is an adduct-type compound include TAKENATE (registered trademark) D-102, D-103, D-103H, D-103M2, P49-75S, D-110N, D-120N, D-140N, and D-160N (Mitsui Chemicals, Inc.), DESMODUR (registered trademark) L75 and UL57SP (Sumika Bayer Urethane Co., Ltd.), CORONATE (registered trademark) HL, HX, and L (Nippon Polyurethane Industry Co., Ltd.), P301-75E (Asahi Kasei Corporation.), and the like.

Examples of commercially available products of an isocyanate compound having 3 or more functional groups that is an isocyanurate-type compound include TAKENATE (registered trademark) D-127N, D-170N, D-170HN, D-172N, and D-177N (Mitsui Chemicals, Inc.), SUMIDUR N3300 and DESMODUR (registered trademark) N3600, N3900, and Z4470BA (Sumika Bayer Urethane Co., Ltd.), CORONATE (registered trademark) HX and HK (Nippon Polyurethane Industry Co., Ltd.), DURANATE (registered trademark) TPA-100, TKA-100, TSA-100, TSS-100, TLA-100, and TSE-100 (Asahi Kasei Corporation.), and the like.

Examples of commercially available products of an isocyanate compound having 3 or more functional groups that is a biuret-type compound include TAKENATE (registered trademark) D-165N and NP1100 (Mitsui Chemicals, Inc.), DESMODUR (registered trademark) N3200 (sumika Bayer Urethane Co., Ltd.), DURANATE (registered trademark) 24A-100 (Asahi Kasei Corporation.), and the like.

In the undercoat liquid according to the aspect B, the content of the isocyanate compound with respect to the total amount of the undercoat liquid is preferably 2% by mass to 90% by mass, more preferably 5% by mass to 70% by mass, and even more preferably 10% by mass to 50% by mass.

—Organic Solvent—

The undercoat liquid according to the aspect B may contain an organic solvent.

In a case where the undercoat liquid according to the aspect B contains an organic solvent, the content of the organic solvent with respect to the total amount of the undercoat liquid according to the aspect B is preferably 2% by mass to 90% by mass, more preferably 5% by mass to 70% by mass, and even more preferably 10% by mass to 50% by mass.

<Overcoat Liquid>

The overcoat liquid contains polymerizable compounds and an organic solvent but does not contain scale-like metal particles.

The proportion of a polymerizable compound having a weight-average molecular weight of 1,000 or more in the polymerizable compounds contained in the overcoat liquid is 50% by mass or more, and the content of the organic solvent with respect to the total amount of the overcoat liquid is 50% by mass or more.

The preferred aspect of the composition of the overcoat liquid is the same as the preferred composition of the ink according to the third aspect, except that the overcoat liquid does not contain scale-like metal particles.

In the ink set of the present disclosure, one of the examples of preferred combinations of the ink and the overcoat liquid is a combination of the ink according to the third aspect and the overcoat liquid.

It is preferable that the overcoat liquid substantially do not contain a colorant (for example, a pigment).

Specifically, the content of the colorant is preferably less than 1% by mass with respect to the total amount of the overcoat liquid.

[Preferred Aspect of Manufacturing Method of Article with Recorded Image (Manufacturing Method X)]

The manufacturing method of the article with a recorded image of the present disclosure is not particularly limited, as long as the article with a recorded image satisfies the conditions described above.

The article with a recorded image of the present disclosure can be preferably manufactured by the following manufacturing method X.

The manufacturing method X is a manufacturing method of an article with a recorded image that uses
  the aforementioned ink of the present disclosure (that is, the active energy ray curable-type ink), the manufacturing method X including
  an ink applying step of applying an ink on a substrate, and
  a curing step A of curing the ink applied on the substrate by irradiation with an active energy ray A to obtain an image,
  in which a time from landing of the ink on the substrate to start of the irradiation with the active energy ray A (hereinafter, also called "time from the landing of the ink to the start of the irradiation with the active energy ray A") is 0.5 seconds or longer.

In the manufacturing method X,
  using the ink of the present disclosure containing the scale-like metal particles described above and
  setting the time from the landing of the ink to the start of the irradiation with the active energy ray A to 0.5 seconds or longer are combined,
  which makes it easy for the average angle between the longitudinal direction of the scale-like metal particles and the surface of the substrate to satisfy the aforementioned conditions in the surface layer portion and inner portion of the image to be formed.

Therefore, with the manufacturing method X, it is easy to satisfy the aforementioned conditions and to manufacture the article with a recorded image of the present disclosure in which the image has excellent metallic glossiness.

The reason why such an effect is obtained is unclear. Presumably, setting the time from the landing of the ink to the start of the irradiation with the active energy ray A to 0.5 seconds or longer may secure time for the scale-like metal particles to move in the surface layer portion of the image, which may allow the scale-like metal particles to be easily aligned substantially parallel to the surface of the substrate and bring about the above effect.

In the manufacturing method X, from the viewpoint of further improving the metallic glossiness of the image, the time from the landing of the ink to the start of the irradiation with the active energy ray A is preferably 1.0 second or longer.

From the viewpoint of further improving the line quality of the image (that is, further suppressing bleeding of the image), the time from the landing of the ink to the start of the irradiation with the active energy ray A is preferably 5.0 seconds or less.

Hereinafter, each step in the manufacturing method X will be described.

<Ink Applying Step>

The ink applying step in the manufacturing method X includes applying ink on a substrate.

Preferred aspects of the substrate and the ink are as described above in the section of [Article with recorded image].

In this step, it is preferable that the ink be applied on a substrate by an ink jet method.

That is, in this step, it is preferable that the ink be jetted from jetting holes (nozzles) of an ink jet head and applied on a substrate.

A single-pass method or a multi-pass method may be used as the method of applying the ink by the ink jet method. From the viewpoint of image recording speed, a single-pass method is preferable.

The single-pass method is a method of using, as an ink jet head, a line head having jetting holes (nozzles) arranged to correspond to entire area of one side of a substrate, in which the line head is disposed at a fixed position, and while the substrate is being transported in a direction intersecting with the arrangement direction of the jetting holes of the line head, an ink is applied on the substrate being transported.

On the other hand, the multi-pass method (also called a scanning method) is a method of using a short serial head as an ink jet head, in which a substrate is scanned with the short serial head such that an ink is applied to the substrate.

In the single-pass method, by causing the substrate to be scanned in a direction intersecting with the arrangement direction of the jetting holes, it is possible to form a pattern on the entire surface of the substrate. Therefore, this method does not require a transport system such as a carriage that moves short heads for scanning. Furthermore, in the single-pass method, complicated scanning control for moving a carriage and a substrate is not necessary, and only a substrate moves. Therefore, the recording speed can be further increased in the single-pass method than in the multi-pass method.

Generally, compared to the multi-pass method, the single-pass method can record images at a higher speed but tends to shorten the time from the landing of the ink to the start of the irradiation with the active energy ray A. Accordingly, in the single-pass method, the scale-like metal particles do not have enough time to move in the surface layer portion of the image (time for the scale-like metal particles to be aligned substantially parallel to the substrate), and thus the effect of metallic glossiness of the image tends not to be easily obtained.

However, according to the manufacturing method X, because the time from the landing of the ink to the start of the irradiation with the active energy ray A is limited to 0.5 seconds or longer, even in a case where a single-pass ink jet method is used, the effect of metallic glossiness of the image is easily obtained. In other words, in a case where a single-pass ink jet method is used, the manufacturing method X more effectively brings about the effect of improving the metallic glossiness of the image.

The amount of the ink jetted from the ink jet head is preferably 1 pL (picoliter) to 100 pL, more preferably 3 pL to 80 pL, and even more preferably 3 pL to 50 pL.

The ink applying step in the manufacturing method X may include heating and drying the ink applied on the substrate.

Particularly, in a case where the ink of the third aspect containing 50% by mass or more of an organic solvent is used, in the ink applying step, it is preferable to heat and dry the ink applied on the substrate.

It is preferable to heat and dry the ink while keeping the surface temperature of the substrate at, for example, 40° C. to 100° C. (more preferably 40° C. to 80° C., and even more preferably 50° C. to 70° C.).

The time of heating and drying is preferably 1 second or longer, more preferably 5 seconds or longer, and particularly preferably 8 seconds or longer.

The upper limit of the time of heating and drying is not particularly limited, but is preferably 60 seconds, more preferably 30 seconds, and particularly preferably 20 seconds.

<Curing Step A>

The curing step A in the manufacturing method X includes curing the ink applied on the substrate (hereinafter, also called "ink film") by irradiation with an active energy ray A to obtain an image.

In the curing step A, the irradiation of the ink film with the active energy ray A polymerizes the polymerizable compounds in the ink film and cures the ink film. In this way, an image is obtained.

As the active energy ray A, ultraviolet rays (UV light) or an electron beam (EB) is preferable.

The peak wavelength of the ultraviolet rays is, for example, preferably 200 nm to 405 nm, more preferably 250 nm to 400 nm, and even more preferably 300 nm to 400 nm.

As the light source for ultraviolet irradiation, a mercury lamp, a gas laser, and a solid-state laser are mainly used. A mercury lamp, a metal halide lamp, and an ultraviolet fluorescent lamp are widely known light sources. Being compact, highly efficient, and low cost and having a long life, UV-LED (light emitting diode) and UV-LD (laser diode) are promising light sources for ultraviolet irradiation. As the light source for ultraviolet irradiation, among these, a metal halide lamp, a high-pressure mercury lamp, a medium-pressure mercury lamp, a low-pressure mercury lamp, or UV-LED is preferable.

The manufacturing method X may have an aspect in which the content of the photopolymerization initiator in the ink is less than 1% by mass with respect to the total amount of the ink, and the active energy ray A is an electron beam.

In the manufacturing method X of this aspect, although the content of the photopolymerization initiator in the ink is less than 1% by mass, the ink can be cured by the irradiation with an electron beam. In addition, in this aspect, because the content of the photopolymerization initiator is less than 1% by mass, the elution of the photopolymerization initiator from the image can be further suppressed. Accordingly, the manufacturing method X of this aspect is particularly suitable as a method of manufacturing, for example, an article with a recorded image for food packaging.

The curing step A is preferably a full curing step of the ink film.

Roughly speaking, the full curing means polymerizing substantially all of the polymerizable compounds in the ink film such that the ink film is substantially completely cured.

Specifically, the full curing means curing the ink film by polymerizing the polymerizable compounds in the ink film until the curing rate of the ink film (that is, the polymerization rate of the polymerizable compounds determined by high-performance liquid chromatography) reaches 90% to 100%.

In the present disclosure, the irradiation with the active energy ray A for the full curing sometimes will be called "curing exposure", and the active energy ray A for the full curing sometimes will be called "curing exposure light".

From the viewpoint of further improving the adhesiveness between the substrate and the image, the illuminance of the active energy ray A as the curing exposure light is preferably 1.0 W/cm or more, more preferably 2.0 W/cm or more, and even more preferably 4.0 W/cm or more.

The upper limit of the illuminance of the active energy ray A as the curing exposure light is not particularly limited, but is, for example, 10 W/cm.

From the viewpoint of further improving the adhesiveness between the substrate and the image, the irradiation energy (that is, the exposure amount) of the active energy ray A as the curing exposure light is preferably 20 mJ/cm$^2$ or more, and more preferably 80 mJ/cm$^2$ or more.

The upper limit of the irradiation energy of the active energy ray A as the curing exposure light is not particularly limited, but is, for example, 240 mJ/cm$^2$.

The irradiation with the active energy ray A is preferably performed in an atmosphere at an oxygen concentration of 0.1% by volume or less. In a case where the irradiation with the active energy ray A is performed in this atmosphere, oxygen is inhibited from hindering polymerization, and an image having higher adhesiveness with the substrate is obtained.

The atmosphere at an oxygen concentration of 0.1% by volume or less is suitably an atmosphere in the presence of an inert gas (for example, a nitrogen gas, an argon gas, or a helium gas).

<Semi-Curing Step>

It is preferable that the manufacturing method X further include a semi-curing step which is performed between the ink applying step and the curing step A after the ink applying step and is a step of semi-curing the ink film (that is, the ink applied on the substrate) by irradiation with an active energy ray P having irradiation energy lower than irradiation energy of the active energy ray A.

In this case, in the aforementioned curing step A, the semi-cured ink film is cured by the irradiation with the active energy ray A, and an image is obtained.

In a case where the manufacturing method X includes the semi-curing step, the line quality of the image is further improved (that is, bleeding of the image is further suppressed).

Roughly speaking, the semi-curing is polymerizing only some of the polymerizable compounds in the ink film such that the ink film is temporarily cured (that is, the ink film is incompletely cured).

Specifically, the semi-curing is polymerizing some of the polymerizable compounds in the ink film until the curing rate of the ink film (that is, the polymerization rate of the polymerizable compounds determined by high-performance liquid chromatography, the shame shall be applied hereinafter) reaches about less than 90% such that the ink film is temporarily cured.

The curing rate of the semi-cured ink film is more preferably 80% or less, even more preferably 70% or less, and still more preferably 50% or less.

The curing rate of the semi-cured ink film is preferably 10% or more, more preferably 20% or more, and even more preferably 30% or more.

In the present disclosure, the irradiation with the active energy ray P for the semi-curing sometimes will be called "pinning exposure", and the active energy ray P for the semi-curing sometimes will be called "pinning exposure light".

The illuminance of the active energy ray P as the pinning exposure light is preferably 0.10 W/cm to 0.50 W/cm, more preferably 0.20 W/cm to 0.49 W/cm, and even more preferably 0.20 W/cm to 0.45 W/cm.

The irradiation energy (that is, the exposure amount) of the active energy ray P as the pinning exposure light is preferably 2 mJ/cm$^2$ to 20 mJ/cm$^2$, and more preferably 4 mJ/cm$^2$ to 15 mJ/cm$^2$.

<Step of Forming Undercoat Layer>

The manufacturing method X may further include a step of applying an undercoat liquid on the substrate and semi-curing the applied undercoat liquid before the ink applying step to form an undercoat layer.

In a case where the manufacturing method X includes the step of forming the undercoat layer, the manufactured article with a recorded image includes an undercoat layer between the substrate and the image.

Preferred aspects of the undercoat liquid (for example, preferred combinations of the ink and the undercoat liquid) are as described in the section of [Ink set].

The undercoat liquid can be applied using known methods such as a coating method, a dipping method, and an ink jet recording method.

The coating method is performed using, for example, a bar coater, an air doctor coater, a blade coater, a rod coater, a knife coater, a squeeze coater, a reverse roll coater, a transfer roll coater, a gravure coater, a kiss roll coater, a cast coater, a spray coater, a curtain coater or an extrusion coater.

The undercoat liquid is preferably applied to the same region as the ink film formed by the application of the ink or a region wider than the ink film. The undercoat liquid is preferably applied to cover the entirety of the region where the ink film is formed.

From the viewpoint of flexibility of the image to be recorded, the thickness of the undercoat layer formed by the application of the undercoat liquid is preferably 0.5 m to 6.0 m, and more preferably 2.0 m to 4.0 m.

The semi-curing of the undercoat liquid can be performed by the irradiation with an active energy ray, as in the semi-curing step of semi-curing the ink.

In this case, preferred aspects of the irradiation conditions of the active energy ray are the same as the preferred aspects of the irradiation conditions of the active energy ray P in the semi-curing step of semi-curing the ink.

<Step of Forming Overcoat Layer>

The manufacturing method X may further include a step of applying an overcoat liquid on the image and curing the applied overcoat liquid after the curing step A to form an overcoat layer.

Preferred aspects of the overcoat liquid (for example, preferred combinations of the ink and the overcoat liquid) are as described in the section of [Ink set].

The overcoat liquid can be applied using known methods such as a coating method, a dipping method, and an ink jet recording method.

Specific examples of the coating method relating to the application of the overcoat liquid are the same as the specific examples of the coating method relating to the application of the undercoat liquid described above.

The curing of the overcoat liquid can be performed by the irradiation with an active energy ray, as in the curing step A of curing the ink.

In this case, preferred aspects of the irradiation conditions of the active energy ray are the same as the preferred aspects of the irradiation conditions of the active energy ray A in the curing step A of curing the ink.

In the step of forming the overcoat layer, it is preferable that the overcoat liquid be heated and dried before being cured (that is, before being irradiated with the active energy ray).

Preferred conditions of heating and drying the overcoat liquid are the same as the preferred conditions of heating and drying the ink.

EXAMPLES

Hereinafter, examples of the present disclosure will be described, but the present disclosure is not limited to the following examples.

Hereinafter, unless otherwise specified, "parts" and "%" are based on mass.

In addition, hereinafter, "solvent" means an organic solvent.

Example 1

<Preparation of Ink>

The components shown in Table 1 were mixed together and stirred to obtain an ink. The stirring was carried out using a mixer (L4R manufactured by Silverson) at room temperature (25° C.) under the conditions of 5,000 rpm for 20 minutes.

The average equivalent circle diameter and average aspect ratio of the scale-like metal particles are measured by the methods described above.

The content of the solvent with respect to the total amount of the ink is determined by the content of the solvent contained in the dispersion liquid of the scale-like metal particles and the amount of the dispersion liquid of the scale-like metal particles added.

<Image Recording>

The aforementioned ink was introduced into a white throttle of a multi-pass (that is, shuttle scan) ink jet printer ("Acuity LED 1600R" manufactured by FUJIFILM Corporation).

As a substrate, a polycarbonate substrate ("PANLITE" manufactured by TEIJIN LIMITED, thickness 400 m) was prepared.

The ink was jetted from the ink jet head of the ink jet printer and applied on the substrate by a multi-pass method (denoted by "M" in the column of "Ink application method" in Table 1 and the subsequent tables) in the form of a solid image (Solid image shape) having a halftone dot rate of 100% and in the form of a 2-point line image.

The application of the ink was performed under the conditions of 1,200 dpi×1,200 dpi, 48 passes, and bidirectional printing. dpi is an abbreviation for dot per inch (the same shall be applied hereinafter).

During the image recording, the lamp work of Acuity LED1600R was set such that the ink applied on the substrate was irradiated with pinning exposure light (exposure light for semi-curing) as the active energy ray P and with the curing exposure light (exposure light for full curing) as the active energy ray A in this order.

The time from the landing of the ink on the substrate to the irradiation of the ink with the pinning exposure light (hereinafter, also called "time from the landing of the ink to the start of the semi-curing") was 0.1 seconds.

The time from the landing of the ink on the substrate to the irradiation of the ink with the curing exposure light (hereinafter, also called "time from the landing of the ink to the start of the full curing") was 2.0 seconds.

The pinning exposure light is ultraviolet rays having a peak wavelength of 385 nm, and the curing exposure light is ultraviolet rays having a peak wavelength of 385 nm.

The irradiation energy of the pinning exposure light was 1,000 mJ/cm$^2$, and the irradiation energy of the curing exposure light was 200 mJ/cm$^2$.

The irradiation of the ink on the substrate with the curing exposure light was performed in a nitrogen purge atmosphere (specifically, in an atmosphere in which the oxygen concentration is 0.1% by volume or less and the nitrogen concentration is 99.9% by volume or more).

Under the above conditions, the ink applied on the substrate was subjected to semi-curing and full curing in this order to record an image (a solid image and a line image), thereby obtaining an article with a recorded image.

<Measurement of Average Equivalent Circle Diameter and Average Thickness of Scale-Like Metal Particles>

The average equivalent circle diameter and average thickness of the scale-like metal particles contained in the dispersion liquid of the scale-like metal particle were measured. The details of the measuring method are as described above.

The results are shown in Table 1.

<Measurement of Average Angle of Scale-Like Metal Particles>

The cross section of the image in the article with a recorded image was observed, and in each of the surface layer portion of the image (specifically, a region within a distance of 100 nm from the surface of the image) and the inner portion of the image (specifically, a region beyond a distance of 100 nm from the surface of the image), the average angle of the scale-like metal particles (specifically, the average angle formed between the longitudinal direction of the scale-like metal particles and the surface of the substrate) was measured. The details of the measuring method are as described above.

The results are shown in Table 1.

<Evaluation of Image>

The following evaluations were carried out on the image in the aforementioned article with a recorded image.

The results are shown in Table 1.

(Metallic Glossiness)

The solid image was visually observed, and the metallic glossiness of the image was evaluated according to the following evaluation standard.

In the following evaluation standard, "AA" is the rank that indicates the best metallic glossiness of the image.

—Evaluation Standard for Metallic Glossiness—

AA: The image has extremely excellent mirror surface glossiness, and the reflected object is clearly seen just as an image reflected on a mirror.

A: The image has excellent metallic glossiness, and it is possible to identify what the reflected object is.

B: The image has metallic glossiness although it is impossible to identify what the reflected object is.

C: The image does not have metallic glossiness and appears gray.

(Line Quality)

By using the line image, the line quality of the image was evaluated as follows.

By using an image evaluation system (a dot analyzer (a dot analyzer "DA6000" manufactured by Oji Scientific Instruments), the ruggedness of the line image (that is, the deviation of the edge of the line image from the ideal edge obtained by the least squares method) was measured. Based on the obtained results, the line quality of the image was evaluated according to the following evaluation standard.

In the following evaluation standard, "A" is the rank that indicates the highest line quality of the image.

—Evaluation Standard for Line Quality—

A: The ruggedness of the line image is less than 2.0.

B: The ruggedness of the line image is 2.0 or more and less than 4.0.

C: The ruggedness of the line image is 4.0 or more and less than 6.0.

D: The ruggedness of the line image is 6.0 or more and less than 8.0.

E: The ruggedness of the line image is 8.0 or more.

(Stretchability)

A sample having a size of 5 cm (length)×2 cm (width) was cut from the solid image. The cut sample was subjected to heat stretching using the following tester under the following conditions.

Tester: TENSILON (manufactured by Shimadzu Corporation.)

Conditions: temperature 180° C., tensile speed 50 mm/min

Based on the length of the sample at a point in time when the image was broken (hereinafter, called "length X2") and the length of the sample before heat stretching (hereinafter, called "length X1"; specifically, 5 cm), a heat stretching rate at a point in time when the image is broken was calculated by the following equation.

$$\text{Heat stretching rate (\%) at point in time when image is broken} = \{(\text{length } X2 - \text{length } X1)/\text{length } X1\} \times 100$$

For example, in a case where the length X2 is 10 cm, the heat stretching rate at a point in time when the image is broken is calculated as 100% as follows.

$$\text{Heat stretching rate (\%)} = \{(10 \text{ cm} - 5 \text{ cm})/5 \text{ cm}\} \times 100 = 100\%$$

Based on the heat stretching rate at a point in time when the image is broken, the stretchability of the image was evaluated according to the following evaluation standard.

In the following evaluation standard, "A" is the rank which shows that the stretchability of the image is most suppressed.

—Evaluation Standard for Heat Stretchability of Image—

A: The heat stretching rate at a point in time when the image is broken is 150% or more.

B: The heat stretching rate at a point in time when the image is broken is 70% or more and less than 150%.

C: The heat stretching rate at a point in time when the image is broken is less than 70%.

(Metallic Glossiness after Stretching)

The sample was cut and subjected to heat stretching in the same manner as in the evaluation of stretchability.

In this evaluation, the heat stretching rate of the heat stretching was fixed at 150%.

By using the sample having undergone heat stretching, the same evaluation as the evaluation of the metallic glossiness described above was carried out.

Example 2

The same operation as in Example 1 was performed except for the following points.
The results are shown in Table 1.
—Differences from Example 1—
In the image recording, the setting of lamp work of Acuity LED1600R was changed, such that the ink applied on the substrate was irradiated with curing exposure light for full curing without being irradiated with pinning exposure light for semi-curing.
The time from the landing of the ink to the start of the full curing (the start of the irradiation with the curing exposure light) was set to 0.1 seconds.

Example 3

The same operation as in Example 1 was performed except for the following points.
The results are shown in Table 1.
—Differences from Example 1—
In the image recording, the setting of lamp work of Acuity LED1600R was changed, such that the ink applied on the substrate was irradiated with curing exposure light for full curing without being irradiated with pinning exposure light for semi-curing.
The time from the landing of the ink to the start of the full curing (the start of the irradiation with the curing exposure light) is 2.0 seconds, as in Example 1.

Example 4

The same operation as in Example 1 was performed except for the following points.
The results are shown in Table 1.
—Differences from Example 1—
In the image recording, the setting of lamp work of Acuity LED1600R was changed, such that the ink applied on the substrate was irradiated with curing exposure light for full curing without being irradiated with pinning exposure light for semi-curing.
The time from the landing of the ink to the start of the full curing (the start of the irradiation with the curing exposure light) was set to 6.0 seconds.

Example 5 and Comparative Examples 1 and 2

The same operation as in Example 1 was performed, except that the components of the ink (mainly the type of dispersion liquid of scale-like metal particles) were changed as shown in Table 1.
The results are shown in Table 1.

TABLE 1

| | | | Example 1 | Example 2 | Example 3 | Example 4 | Example 5 | Comparative example 1 | Comparative example 2 |
|---|---|---|---|---|---|---|---|---|---|
| Components of ink (parts by mass) | Dispersion liquid of scale-like metal particles | In particle dispersion liquid 1 (solid content 60% by mass, containing only solvent as dispersion medium) | 3.3 | 3.3 | 3.3 | 3.3 | | | |
| | | In particle dispersion liquid 2 (solid content 16% by mass, containing PEA as main dispersion medium) | | | | | 12.4 | | |
| | | Al particle dispersion liquid 1 (solid content 5.1% by mass, containing only solvent as dispersion medium) | | | | | | 39.1 | |
| | | Ag particle dispersion liquid 1 (solid content 43% by mass, containing only solvent as dispersion medium) | | | | | | | 5.0 |
| | Polymerizable compounds | PEA (monofunctional) | 35.5 | 35.5 | 35.5 | 35.5 | 24.6 | 17.4 | 33.8 |
| | | IBOA (monofunctional) | 29.5 | 29.5 | 29.5 | 29.5 | 29.5 | 10.0 | 29.5 |
| | | NVC (monofunctional) | 20.7 | 20.7 | 20.7 | 20.7 | 20.7 | 20.7 | 20.7 |

TABLE 1-continued

|  |  | Example 1 | Example 2 | Example 3 | Example 4 | Example 5 | Comparative example 1 | Comparative example 2 |
|---|---|---|---|---|---|---|---|---|
|  | Resin BR113 | 3.0 | 3.0 | 3.0 | 3.0 | 3.0 | 3.0 | 3.0 |
|  | Photopoly- 184 | 2.9 | 2.9 | 2.9 | 2.9 | 2.9 | 2.9 | 2.9 |
|  | merization 819 | 3.9 | 3.9 | 3.9 | 3.9 | 3.9 | 3.9 | 3.9 |
|  | initiator ITX | 1.0 | 1.0 | 1.0 | 1.0 | 1.0 | 1.0 | 1.0 |
|  | Poly- UV12 | 0.2 | 0.2 | 0.2 | 0.2 | 0.2 | 0.2 | 0.2 |
|  | merization inhibitor |  |  |  |  |  |  |  |
|  | Equivalent circle diameter of scale-lime metal particles (nm) | 300 | 300 | 300 | 300 | 300 | 1000 | 40 (*1) |
|  | Average thickness of scale-lime metal particles (nm) | 30 | 30 | 30 | 30 | 30 | 10 | 40 (*1) |
|  | Average aspect ratio of scale-lime metal particles | 10 | 10 | 10 | 10 | 10 | 100 | — (*1) |
|  | Content of solvent with respect to total amount of ink (% by mass) | 1.3 | 1.3 | 1.3 | 1.3 | 0.12 | 36.4 | 2.85 |
| Image recording conditions | Ink application method | M | M | M | M | M | M | M |
|  | Time from landing of ink to start of full curing (sec) | 2.0 | 0.1 | 2.0 | 6.0 | 2.0 | 2.0 | 2.0 |
|  | Whether or not semi-curing is performed | Performed | Not performed | Not performed | Not performed | Performed | Performed | Performed |
|  | Time from landing of ink to start of semi-curing (sec) | 0.1 | — | — | — | 0.1 | 0.1 | 0.1 |
| Average angle of scale-like metal particles in image (°) | Surface layer portion of image | 10 | 15 | 10 | 10 | 15 | 45 | — (*1) |
|  | Inner portion of image | 45 | 45 | 45 | 45 | 45 | 45 | — (*1) |
| Evaluation result | Metallic glossiness | A | B | A | A | B | C | C |
|  | Line quality | A | A | B | B | A | B | B |
|  | Stretchability | A | A | A | A | A | A | A |
|  | Metallic glossiness after stretching | A | B | A | A | B | C | C |

(*1) spherical Ag particle having diameter of 40 nm

—Explanation of Table 1—

Details of each component in Table 1 are as follows.

In particle dispersion liquid 1: dispersion liquid obtained by concentrating "LeafPowder (registered trademark) 49CJ-1120" (containing 20% by mass of In particles (solid content) which are flakes peeled from an In film) manufactured by OIKE & Co., Ltd. and having In particle content of 60% by mass, which contains propylene glycol monomethyl ether (PGME) as dispersion medium.

In particle dispersion liquid 2: dispersion liquid prepared by replacing the solvent (PGME) in particle dispersion liquid 1 with polymerizable compound (phenoxyethyl acrylate; PEA) by decantation, which contains 16% by mass of In particles (solid content) that are flakes peeled from In film and PEA as main dispersion medium and in which the amount of residual PGME is 1% by mass with respect to total amount of dispersion liquid 2.

Al particle dispersion liquid 1: high-brightness grade product (particle thickness 20 nm) of Al of "LeafPowder (registered trademark)" manufactured by OIKE & Co., Ltd. (containing 5.1% by mass of Al particles (solid content) that are flakes peeled from Al film and containing diethylene glycol diethyl ether (DEDG) as dispersion medium).

Ag particle dispersion liquid 1: "OAG-IJS018" manufactured by Nagase ChemteX Corporation. (containing 43% by mass of spherical Ag particles (solid content) and containing 2-(2-butoxyethoxy)ethanol as dispersion medium.

PEA: phenoxyethyl acrylate
IBOA: isobornyl acrylate
NVC: N-vinylcaprolactam
BR113: acrylic polymer "DIANAL (registered trademark) BR113" manufactured by Mitsubishi Chemical Corporation.
184: IGM Resins B. V. "Omnirad 184" (1-hydroxycyclohexyl-phenyl-ketone) manufactured by IGM Resins B. V.
819: "OMnirad 819" (Bis(2,4,6-trimethylbenzoyl)phenylphosphine oxide) manufactured by IGM Resins B. V.
ITX: isopropylthioxanthone
UV12: "FLORSTAB UV12" (nitroso-based polymerization inhibitor; tris(N-nitroso-N-phenylhydroxylamine) aluminum salt) manufactured by Kromachem Ltd.

As shown in Table 1, in the article with a recorded image of each example in which the scale-like metal particles were In particles, the average angle of the scale-like metal particles in the surface layer portion of the image was 300 or less, and the average angle of the scale-like metal particles in the inner portion of the image was more than 30°, the image had excellent metallic glossiness. In the article with a recorded image of each example, the image was also excellent in line quality, stretchability and metallic glossiness after stretching.

On the other hand, in Comparative Example 1 in which the scale-like metal particles were Al particles, the metallic glossiness of the image deteriorated.

In addition, in Comparative Example 2 containing spherical Ag particles instead of the scale-like metal particles (In particles), the metallic glossiness of the image deteriorated.

Between Examples 1 and 5, Example 1 using the ink having an organic solvent content of 1% by mass or more was better in the metallic glossiness of the image and the metallic glossiness after heating.

Between Examples 1 and 2, Example 1 in which the time from the landing of the ink to the start of the full curing was 0.5 seconds or longer was better in the metallic glossiness of the image and the metallic glossiness after heating.

Between Examples 1 and 3, Example 1 in which semi-curing (that is, irradiation with pinning exposure light) was performed before the full curing (that is, irradiation with curing exposure light) was better in the line quality of the image.

Example 101

<Preparation of Ink>

The components shown in Table 2 were mixed together and stirred under the same conditions as the stirring conditions in Example 1, thereby obtaining an ink.

<Image Recording>

The aforementioned ink was introduced into a cyan throttle of a multi-pass (that is, shuttle scan) ink jet printer ("JV400SUV" manufactured by MIMAKI ENGINEERING CO., LTD.).

As a substrate, "CAPPUCCINO" (synthetic leather substrate made of polyvinyl chloride) manufactured by YAMA-PLAS CO., LTD. was prepared.

The ink was jetted from the ink jet head of the ink jet printer and applied on the substrate by a shuttle scan method in the form of a solid image (Solid image shape) having a halftone dot rate of 100% and in the form of a 2-point line image.

The application of the ink was performed under the conditions of 1,200 dpi×900 dpi, 48 passes, and bidirectional printing.

JV400SUV does not have a pinning light source. Therefore, in the present example, the ink applied on the substrate was subjected to heat drying (70° C., 300 seconds) and then irradiated with curing exposure light (exposure light for full curing) without being irradiated with pinning exposure light.

The time from the landing of the ink on the substrate to the irradiation of the ink with the curing exposure light (hereinafter, also called "time from the landing of the ink to the start of the full curing") was 300 seconds.

As a curing exposure light source, a hot cathode tube was used. The irradiation energy of the curing exposure light was 400 mJ/cm$^2$.

Under the above conditions, the ink applied on the substrate was subjected to heat drying and full curing to record an image (a solid image and a line image), thereby obtaining an article with a recorded image.

<Measurement of Average Equivalent Circle Diameter and Average Thickness of Scale-Like Metal Particles>

The average equivalent circle diameter and average thickness of the scale-like metal particles were measured in the same manner as in Example 1.

The results are shown in Table 2.

<Measurement of Average Angle of Scale-Like Metal Particles>

The average angle of the scale-like metal particles was measured in the same manner as in Example 1.

The results are shown in Table 2.

<Evaluation of Image>

The following evaluations were carried out on the image in the aforementioned article with a recorded image.

The results are shown in Table 2.

(Metallic Glossiness and Line Quality)

The metallic glossiness and line quality of the image were evaluated in the same manner as in Example 1.

(Rub Resistance)

The solid image in the article with a recorded image was subjected to JSPS test in which the solid image is rubbed with cloth 100 times under a weight of 500 g. Based on the obtained results, the rub resistance of the image was evaluated according to the following evaluation standard.

In the following evaluation standard, "AA" is the rank that indicates the best rub resistance of the image.

—Evaluation Standard for Rub Resistance of Image—
AA: Color was not transferred to the cloth with which the image is rubbed, and the image does not go through a density change.
A: Color was slightly transferred (less than 0.05 in terms of color density) to the cloth with which the image is rubbed, but the image does not go through a density change.
B: Color was slightly transferred (0.05 or more in terms of color density) to the cloth with which the image is rubbed, but the image does not go through a density change.
C: Color transfer is observed on the cloth with which the image is rubbed, and the color density of the image is reduced.

Example 102

<Preparation of Overcoat Liquid>

The components shown in Table 2 were mixed together and stirred under the same conditions as the stirring conditions in Example 1, thereby obtaining an overcoat liquid.

<Formation of Overcoat Layer>

The overcoat liquid was introduced into a yellow throttle of the aforementioned JV400SUV and applied in the form of a solid coating to the entirety of the image (that is, the solid image and the line image) in the article with a recorded image manufactured in Example 101 and the region where no image was formed, followed by drying and full curing, thereby forming an overcoat layer (OC layer).

The application of the overcoat liquid was performed under the conditions of 1,200 dpi×900 dpi, 48 passes, and bidirectional printing.

The conditions of drying and full curing were the same as in Example 101.

In the manner described above, an article with a recorded image comprising a substrate, an image, and an OC layer was obtained.

<Measurement of Average Angle of Scale-Like Metal Particles>

The average angle of the scale-like metal particles was measured in the same manner as in Example 101. The surface of the image in this example means an interface between the image and the OC layer.

The results are shown in Table 2.

<Evaluation of Image>

The following evaluation was performed on the image with the OC layer (that is, the laminate of the OC layer and the image) in the aforementioned article with a recorded image.

The results are shown in Table 2.

(Metallic Glossiness)

In the same manner as in the evaluation of the metallic glossiness of the image in Example 101, the metallic glossiness of the image with the OC layer in Example 102 was evaluated.

(Line Quality)

In the same manner as in the evaluation of the line quality of the image in Example 101, the line quality of the image with the OC layer in Example 102 was evaluated.

(Rub Resistance)

In the same manner as in the evaluation of the rub resistance of the image in Example 101, the rub resistance of the image with the OC layer in Example 102 was evaluated.

metal particles in the surface layer portion of the image was 300 or less, and the average angle of the scale-like metal particles in the inner portion of the image was more than 30°, the image had excellent metallic glossiness. In the article with a recorded image of each example, the line quality and rub resistance of the image were also ensured.

Between Examples 101 and 102, Example 102 provided with a predetermined OC layer was better in the metallic glossiness and rub resistance of the image.

TABLE 2

|  |  |  | Example 101 | Example 102 |
|---|---|---|---|---|
| Components of ink (parts by mass) | Dispersion liquid of scale-like particles | In particle dispersion liquid 1 (solid content 60% by mass, containing only solvent as dispersion medium) | 10 | 10 |
|  | Solvent | MBA | 69.9 | 69.9 |
|  | Polymerizable compound | Genomer 4215 (bifunctional, Mw 5,000) | 16.0 | 16.0 |
|  | Photopolymerization initiator | 819 | 2.1 | 2.1 |
|  |  | 2959 | 1.0 | 1.0 |
|  | Polymerization inhibitor | UV22 | 1.0 | 1.0 |
| Equivalent circle diameter of scale-lime metal particles (nm) |  |  | 300 | 300 |
| Average thickness of scale-lime metal particles (nm) |  |  | 30 | 30 |
| Average aspect ratio of scale-lime metal particles |  |  | 10 | 10 |
| Content of solvent with respect to total amount of ink (% by mass) |  |  | 4.0 | 4.0 |
| Image recording conditions | Ink application method |  | M | M |
|  | Time from landing of ink to start of full curing (sec) |  | 300 | 300 |
| Average angle of scale-like metal particles in image (°) | Surface layer portion of image |  | 10 | 10 |
|  | Inner portion of image |  | 45 | 45 |
| Components of OC liquid | Solvent | MBA | Non-use of OC liquid | 76 |
|  | Polymerizable compound | Genomer 4215 (bifunctional, Mw 5,000) |  | 7.5 |
|  |  | UV-7630B (hexafunctional, Mw 2,200) |  | 7.5 |
|  | Photopolymerization initiator | 819 |  | 4.0 |
|  |  | 2959 |  | 2.0 |
|  | Polymerization inhibitor | UV12 |  | 1.0 |
|  | Surfactant | KP109 |  | 2.0 |
| Evaluation result | Metallic glossiness |  | A | AA |
|  | Line quality |  | A | A |
|  | Rub resistance |  | B | A |

—Explanation of Table 2—

Details of each component in Table 2 are as follows. Among the components in Table 2, for the components other than the following components, the explanation of Table 1 can be referred to.

MBA: methoxybutyl acetate

Genomer 4215: bifunctional urethane acrylate manufactured by RAHN AG (Mw=5,000).

2959: "Omnirad 2959" (1-[4-(2-hydroxyethoxy)-phenyl]-2-hydroxy-methylpropanone) manufactured by IGM Resins B.V.

UV22: BASF "IRGASTAB UV22" (quinone-based polymerization inhibitor) of BASF SE

UV-7630B: hexafunctional urethane acrylate "Shikoh UV-7630B" manufactured by NIHON GOSEI KAKO Co., Ltd. (Mw=2,200)

KP109: "KP109" (50% by mass propylene glycol monomethyl ether solution of polyether-modified siloxane compound, Mw 12,000, content of siloxane structure 29% by mass) (silicone-based surfactant) manufactured by Shin-Etsu Chemical Co., Ltd.

As shown in Table 2, in the articles with a recorded image of Examples 101 and 102 in which the scale-like metal particles were In particles, the average angle of the scale-like Example 201

<Preparation of Undercoat Liquid 1>

The components shown in Table 3 were mixed together and stirred under the same conditions as the stirring conditions in Example 1, thereby obtaining a part A of an undercoat liquid 1.

A part B of the undercoat liquid 1 consisting of the components shown in Table 3 was prepared.

The part A and the part B were mixed together immediately before image recording and used as the undercoat liquid 1.

<Preparation of Ink>

The components shown in Table 3 were mixed together and stirred under the same conditions as the stirring conditions in Example 1, thereby obtaining an ink.

<Image Recording>

The aforementioned ink was introduced into a sixth throttle of a single-pass ink jet printer ("Jet Press 540WV" manufactured by FUJIFILM Corporation).

As a substrate, "TAIKO PET" (polyethylene terephthalate substrate, thickness 12 μm) manufactured by FUTAMURA CHEMICAL CO., LTD. was prepared.

The part A and the part B were mixed together to prepare the undercoat liquid 1. The aforementioned substrate was coated with the prepared undercoat liquid 1 by an anilox roller in the aforementioned ink jet printer, followed by drying, thereby forming an undercoat layer having a thickness of 4 μm.

The ink was then jetted from the ink jet head of the ink jet printer and applied on the undercoat layer formed on the substrate by a single-pass method in the form of a solid image (Solid image shape) having a halftone dot rate of 100% and in the form of a 2-point line image.

The ink was applied under the conditions of 600 dpi×600 dpi, single pass (denoted by "S" in the column of Ink application method in Table 3 and subsequent tables), and a substrate transportation speed of 50 m/min.

Thereafter, the ink applied on the substrate was irradiated with pinning exposure light (exposure light for semi-curing) as the active energy ray P and with the curing exposure light (exposure light for full curing) as the active energy ray A in this order. The time from the landing of the ink to the start of the semi-curing was 0.1 seconds, and the time from the landing of the ink to the start of the full curing was 2.0 seconds.

Both the pinning exposure light and the curing exposure light are ultraviolet rays having a peak wavelength of 385 nm.

The irradiation energy of the pinning exposure light was 350 mJ/cm$^2$, and the irradiation energy of the curing exposure light was 6,600 mJ/cm$^2$.

The irradiation of the ink on the substrate with the curing exposure light was performed in a nitrogen purge atmosphere (specifically, in an atmosphere in which the oxygen concentration is 0.1% by volume or less and the nitrogen concentration is 99.9% by volume or more).

Under the above conditions, the ink applied on the substrate was subjected to semi-curing and full curing in this order to record an image (a solid image and a line image), thereby obtaining an article with a recorded image.

<Evaluation of Image>

The following evaluations were carried out on the image in the aforementioned article with a recorded image.

The results are shown in Table 3.

(Metallic Glossiness)

The metallic glossiness was evaluated in the same manner as in the evaluation of the metallic glossiness of the image in Example 1.

(Line Quality)

The line quality was evaluated in the same manner as in the evaluation of the line quality of the image in Example 1.

(Elution Resistance)

The elution resistance of the image was evaluated as follows.

A circular sample having a diameter of 10 cm was cut from a portion of the article with a recorded image on which a solid image was recorded. A linear low-density polyethylene (LLDPE) laminate film having a thickness of 20 m was attached to the solid image of the cut circular sample (hereinafter, the attachment surface will be called a laminate surface). The laminate surface was brought into contact with 50 mL of 100% ethanol as an extraction solvent, and in this state, extraction was performed at 40° C. for 10 days through the laminate film. The obtained extract was analyzed by liquid chromatography (Prominence series: manufactured by Shimadzu Corporation.), and the monomer concentration in the extract was measured.

Based on the obtained results, the elution resistance of the image was evaluated according to the following evaluation standard.

In the following evaluation standard, "A" is the rank which shows that the elution resistance of the image is the best.

—Evaluation Standard for Elution Resistance—
A: The monomer concentration in the extract is 50 ppb by mass or less.
B: The monomer concentration in the extract is 50 ppb by mass to 100 ppb by mass.
C: The monomer concentration in the extract is 100 ppb by mass or more.

Example 202

In the image recording, the same operation as in Example 201 was performed, except that the semi-curing (that is, the irradiation with pinning exposure light) was not performed.

The results are shown in Table 3.

Example 203

The same operation as in Example 202 was performed, except that the time from the landing of the ink to the start of the full curing was changed to 0.1 seconds.

The results are shown in Table 3.

TABLE 3

|  |  |  | Example 201 | Example 202 | Example 203 |
|---|---|---|---|---|---|
| Components of undercoat liquid 1 (part A) | Polymerizable compound | 3MPDDA (bifunctional) | 65.6 | 65.6 | 65.6 |
|  |  | DPHA (hexafunctional) | 11.7 | 11.7 | 11.7 |
|  |  | UV-7630B (hexafunctional, Mw 2,200) | 17.7 | 17.7 | 17.7 |
|  | Photopolymerization initiator | 819 | 3.8 | 3.8 | 3.8 |
|  | Polymerization inhibitor | UV22 | 0.01 | 0.01 | 0.01 |
|  | Surfactant | BYK307 | 2.0 | 2.0 | 2.0 |
| Components of undercoat liquid 1 (part B) | Isocyanate compound | D-170N | 100.0 | 100.0 | 100.0 |

TABLE 3-continued

|  |  |  | Example 201 | Example 202 | Example 203 |
|---|---|---|---|---|---|
| Component of ink (parts by mass) | Dispersion liquid of scale-like metal particles | In particle dispersion liquid 1 (solid content 60% by mass, containing only solvent as dispersion medium) | 3.3 | 3.3 | 3.3 |
|  | Polymerizable compound | 3MPDDA (bifunctional) | 77.5 | 77.5 | 77.5 |
|  |  | SR344 (bifunctional) | 9.9 | 9.9 | 9.9 |
|  | Photopolymerization initiator | 819 | 4.0 | 4.0 | 4.0 |
|  |  | Speedcure 7010L | 4.0 | 4.0 | 4.0 |
|  | Polymerization inhibitor | UV22 | 0.3 | 0.3 | 0.3 |
|  | Polymer dispersant | Solsperse 32000 | 1.0 | 1.0 | 1.0 |
| Equivalent circle diameter of scale-lime metal particles (nm) |  |  | 300 | 300 | 300 |
| Average thickness of scale-lime metal particles (nm) |  |  | 30 | 30 | 30 |
| Average aspect ratio of scale-lime metal particles |  |  | 10 | 10 | 10 |
| Content of solvent with respect to total amount of ink (% by mass) |  |  | 1.3 | 1.3 | 1.3 |
| Image recording conditions | Ink application method |  | S | S | S |
|  | Time from landing of ink to start of full curing (sec) |  | 2.0 | 2.0 | 0.1 |
|  | Whether or not semi-curing is performed |  | Performed | Not performed | Not performed |
|  | Time from landing of ink to start of semi-curing (sec) |  | 0.1 | — | — |
| Average angle of scale-like metal particles in image (°) | Surface layer portion of image |  | 10 | 10 | 15 |
|  | Inner portion of image |  | 45 | 45 | 45 |
| Evaluation result | Metallic glossiness |  | A | A | B |
|  | Line quality |  | A | B | A |
|  | Elution resistance |  | A | A | A |

—Explanation of Table 3—

Details of each component in Table 3 are as follows. Among the components in Table 3, for the components other than the following components, the explanation of Tables 1 and 2 can be referred to.

3MPDDA: 3-methylpentadiol diacrylate

DPHA: dipentaerythritol hexaacrylate

SR344: polyethylene glycol (400) diacrylate

BYK307: "BYK307" (silicone-based surfactant) manufactured by BYK-Chemie Japan K.K.

D-170N: "TAKENATE D-170N" manufactured by Mitsui Chemicals, Inc. (isocyanate compound)

Speedcure 7010L: high-molecular-weight photopolymerization initiator manufactured by Lambson Ltd.

Solsperse 32000: polymer dispersant manufactured by Lubrizol Japan Limited.

As shown in Table 3, in the articles with a recorded image of Examples 201 to 203 in which the scale-like metal particles are In particles, the average angle of the scale-like metal particles in the surface layer portion of the image was 300 or less, and the average angle of the scale-like metal particles in the inner portion of the image was more than 30°, the image had excellent metallic glossiness.

In the articles with a recorded image of Examples 201 to 203, the line quality and elution resistance of the image were excellent.

Between Examples 201 and 202, Example 201 in which the semi-curing was performed before the full curing was better in line quality.

Between Examples 202 and 203, Example 202 in which the time from the landing of the ink to the start of the full curing was 0.5 seconds or longer was better in the metallic glossiness of the image.

Example 204

<Preparation of Undercoat Liquid 1>

The components shown in Table 4 were mixed together and stirred under the same conditions as the stirring conditions in Example 1, thereby obtaining an undercoat liquid 2.

<Preparation of Ink>

The components shown in Table 4 were mixed together and stirred under the same conditions as the stirring conditions in Example 1, thereby obtaining an ink.

<Image Recording>

The same operation as in Example 201 was performed to obtain an article with a recorded image, except that "PURE-THERMO" (polypropylene substrate, thickness 300 m) manufactured by Idemitsu Unitech Co., Ltd. was used as a substrate, the undercoat liquid 2 was used as an undercoat liquid, and the aforementioned ink was used as an ink.

<Evaluation of Image>

For the image in the aforementioned article with a recorded image, the metallic glossiness, line quality, stretchability, and metallic glossiness after stretching were evaluated as in Example 1.

The results are shown in Table 4.

Example 205

In the image recording, the same operation as in Example 204 was performed, except that the semi-curing (that is, the irradiation with pinning exposure light) was not performed.

The results are shown in Table 4.

Example 206

The same operation as in Example 205 was performed, except that the time from the landing of the ink to the start of the full curing was changed to 0.1 seconds.

The results are shown in Table 4.

TABLE 4

| | | | Example 204 | Example 205 | Example 206 |
|---|---|---|---|---|---|
| Undercoat liquid 2 | Polymerizable compound | PEA (monofunctional) | 32.2 | 32.2 | 32.2 |
| | | IBOA (monofunctional) | 29.5 | 29.5 | 29.5 |
| | | NVC (monofunctional) | 21.7 | 21.7 | 21.7 |
| | | TEGORad 2010 (penta-to hexafunctional) | 1.8 | 1.8 | 1.8 |
| | Photopolymerization initiator | 819 | 4.0 | 4.0 | 4.0 |
| | Polymerization inhibitor | UV12 | 0.3 | 0.3 | 0.3 |
| | Resin | BR113 | 10.5 | 10.5 | 10.5 |
| Components of ink (parts by mass) | Dispersion liquid of scale-like metal particles | In particle dispersion liquid 1 (solid content 60% by mass, containing only solvent as dispersion medium) | 3.3 | 3.3 | 3.3 |
| | Polymerizable compound | PEA (monofunctional) | 38.3 | 38.3 | 38.3 |
| | | IBOA (monofunctional) | 29.5 | 29.5 | 29.5 |
| | | NVC (monofunctional) | 20.7 | 20.7 | 20.7 |
| | Polymerization initiator | 819 | 4.0 | 4.0 | 4.0 |
| | | TPO | 2.0 | 2.0 | 2.0 |
| | | ITX | 2.0 | 2.0 | 2.0 |
| | Polymerization inhibitor | UV12 | 0.2 | 0.2 | 0.2 |
| Equivalent circle diameter of scale-lime metal particles (nm) | | | 300 | 300 | 300 |
| Average thickness of scale-lime metal particles (nm) | | | 30 | 30 | 30 |
| Average aspect ratio of scale-lime metal particles | | | 10 | 10 | 10 |
| Content of solvent with respect to total amount of ink (% by mass) | | | 1.3 | 1.3 | 1.3 |
| Image recording conditions | Ink application method | | S | S | S |
| | Time from landing of ink to start of full curing (sec) | | 2.0 | 2.0 | 0.1 |
| | Whether or not semi-curing is performed | | Performed | Not performed | Not performed |
| | Time from landing of ink to start of semi-curing (sec) | | 0.1 | — | — |
| Average angle of scale-like metal particles in image (°) | Surface layer portion of image | | 10 | 10 | 15 |
| | Inner portion of image | | 45 | 45 | 45 |
| Evaluation result | Metallic glossiness | | A | A | B |
| | Line quality | | A | B | A |
| | Stretchability | | A | A | A |
| | Metallic glossiness after stretching | | A | A | B |

—Explanation of Table 4—

Details of each component in Table 4 are as follows. Among the components in Table 4, for the components other than the following components, the explanation of Tables 1 to 3 can be referred to.

TEGO Rad2010: "TEGO (registered trademark) Rad2010" manufactured by Evonik Degussa GmbH (silicone polyether acrylate having 5 or 6 functional groups).

TPO: IGM Resins B. V. "Omnirad TPO H" (2,4,6-trimethylbenzoyldiphenylphosphine oxide) manufactured by IGM Resins B. V.

As shown in Table 4, in the articles with a recorded image of Examples 204 to 206 in which the scale-like metal particles were In particles, the average angle of the scale-like metal particles in the surface layer portion of the image was 300 or less, and the average angle of the scale-like metal particles in inner portion of the image was more than 30°, the image had excellent metallic glossiness. In the articles with a recorded image of Examples 204 to 206, the image was also excellent in line quality, stretchability, and metallic glossiness after stretching.

Between Examples 204 and 205, Example 204 in which the semi-curing was performed before the full curing was better in line quality.

Between Examples 205 and 206, Example 205 in which the time from the landing of the ink to the start of the full curing was 0.5 seconds or longer was better in the metallic glossiness of the image.

Examples 301 to 303

<Preparation of Ink>

The components shown in Table 5 were mixed together and stirred under the same conditions as the stirring conditions in Example 1, thereby obtaining an ink.

<Image Recording>

Image recording was performed in the same manner as the image recording in Example 1, except that the aforementioned ink was used as an ink, and "VIEWFUL UV TP-188" (polyethylene terephthalate substrate having a thickness of 188 m) manufactured by KIMOTO was used as a substrate.

<Measurement and Evaluation>

The ink and the article with a recorded image were measured and evaluated as in Example 101.

The results are shown in Table 5.

Examples 304 to 306

<Formation of OC Layer>

An overcoat liquid "Acuity LED 1600 INK Clear LL391" manufactured by FUJIFILM Corporation was applied in the form of a solid coating to the entirety of the image (that is, the solid image and the line image) in the articles with a recorded image manufactured in Examples 301 to 303 and the regions where no image was formed in the articles with a recorded image, followed by full curing, thereby forming an overcoat layer (OC layer).

"Acuity LED 1600 INK Clear LL391" contains polymerizable compounds and an organic solvent but does not contain scale-like metal particles, in which a proportion of a polymerizable compound having a weight-average molecular weight of 1,000 or more in the polymerizable compounds contained in the overcoat liquid is 50% by mass or more, and a content of the organic solvent is 50% by mass or more with respect to a total amount of the overcoat liquid.

The conditions of the full curing were the same as the conditions in Example 301.

In the manner described above, an article with a recorded image comprising a substrate, an image, and an OC layer was obtained.

<Measurement and Evaluation>

The ink and the article with a recorded image were measured and evaluated as in Example 101.

The results are shown in Table 5.

TABLE 5

| | | | Example 301 | Example 302 | Example 303 | Example 304 | Example 305 | Example 306 |
|---|---|---|---|---|---|---|---|---|
| Components of ink (parts by mass) | Dispersion liquid of scale-like particles | In particle dispersion liquid 1 (solid content 60% by mass, containing only solvent as dispersion medium) | 3.3 | 3.3 | 3.3 | 3.3 | 3.3 | 3.3 |
| | Polymerizable compound | CTFA (monofunctional) | 55.3 | 55.3 | 55.3 | 55.3 | 55.3 | 55.3 |
| | | NVC (monofunctional) | 23.0 | 23.0 | 23.0 | 23.0 | 23.0 | 23.0 |
| | | EOTMPTA (trifunctional) | 2.8 | 2.8 | 2.8 | 2.8 | 2.8 | 2.8 |
| | | CN964A85 (bifunctional) | 3.8 | 3.8 | 3.8 | 3.8 | 3.8 | 3.8 |
| | Photopolymerization initiator | 819 | 5.0 | 5.0 | 5.0 | 5.0 | 5.0 | 5.0 |
| | | TPO | 2.8 | 2.8 | 2.8 | 2.8 | 2.8 | 2.8 |
| | | ITX | 3.0 | 3.0 | 3.0 | 3.0 | 3.0 | 3.0 |
| | Photopolymerization initiator | UV12 | 1.0 | 1.0 | 1.0 | 1.0 | 1.0 | 1.0 |
| Equivalent circle diameter of scale-lime metal particles (nm) | | | 300 | 300 | 300 | 300 | 300 | 300 |
| Average thickness of scale-lime metal particles (nm) | | | 30 | 30 | 30 | 30 | 30 | 30 |
| Average aspect ratio of scale-lime metal particles | | | 10 | 10 | 10 | 10 | 10 | 10 |
| Content of solvent with respect to total amount of ink (% by mass) | | | 1.3 | 1.3 | 1.3 | 1.3 | 1.3 | 1.3 |
| Image recording condition | Ink application method | | M | M | M | M | M | M |
| | Time from landing of ink to start of full curing (sec) | | 2.0 | 0.1 | 2.0 | 2.0 | 0.1 | 2.0 |
| | Whether or not semi-curing is performed | | performed | Not performed | Not performed | performed | Not performed | Not performed |
| | Time from landing of ink to start of semi-curing (sec) | | 0.1 | — | — | 0.1 | — | — |
| Average angle of scale-like metal particles in image (°) | Surface layer portion of image | | 10 | 15 | 10 | 10 | 15 | 10 |
| | Inner portion of image | | 45 | 45 | 45 | 45 | 45 | 45 |
| Presence or absence of OC layer | | | Absent | Absent | Absent | Present | Present | Present |
| Evaluative result | Metallic glossiness | | A | B | A | AA | B | AA |
| | Line quality | | A | A | B | A | A | B |
| | Elution resistance | | A | A | A | AA | AA | AA |

—Explanation of Table 5—

Details of each component in Table 5 are as follows. Among the components in Table 5, for the components other than the following components, the explanation of Tables 1 to 4 can be referred to.

CTFA: cyclic trimethylolpropane formal acrylate (SR531, manufactured by Sartomer Japan Inc.)

EOTMPTA: ethoxylated (3) trimethylolpropane triacrylate (SR454 D NS, manufactured by Sartomer Japan Inc.)

CN964A85: bifunctional urethane acrylate manufactured by Sartomer Japan Inc.

As shown in Table 5, in the articles with a recorded image of Examples 301 to 306 in which In particles were scale-like metal particles, the average angle of the scale-like metal particles in the surface layer portion of the image was 300 or less, and the average angle of the scale-like metal particles in inner portion of the image was more than 30°, the image had excellent metallic glossiness. In the article with a recorded image of each example, the line quality and rub resistance of the image were also ensured.

Among Examples 301 to 306, Examples 304 to 306 provided with the OC layer were better in the rub resistance of the image.

Among Examples 301 and 306, Examples 301, 303, 304, and 306 in which the time from the landing of the ink to the start of the full curing was 0.5 seconds or longer were better in the metallic glossiness of the image.

Example 401

<Preparation of Undercoat Liquid 3>

The components shown in Table 6 were mixed together and stirred under the same conditions as the stirring conditions in Example 1, thereby obtaining a part A of an undercoat liquid 3.

A part B of the undercoat liquid 3 consisting of the components shown in Table 6 was prepared.

The part A and the part B were mixed together immediately before image recording and used as the undercoat liquid 3.

<Preparation of Ink>

The components shown in Table 6 were mixed together and stirred under the same conditions as the stirring conditions in Example 1, thereby obtaining an ink.

<Image Recording>

As a substrate, "TAIKO PET" (polyethylene terephthalate substrate, thickness 50 m) manufactured by FUTAMURA CHEMICAL CO., LTD. was prepared.

The aforementioned ink was introduced into an evaluation kit comprising an ink jet head "SG1024MA" (single-pass type) manufactured by FUJIFILM Corporation, and the evaluation kit into which the ink was introduced was disposed immediately before an EB irradiation device of a CB200/45/300 (manufactured by ESI) pilot line.

The part A and the part B were mixed together to prepare the undercoat liquid 3, and the aforementioned substrate was coated with the prepared undercoat liquid 3 by a microgravure coater installed in the pilot line, thereby forming an undercoat layer having a thickness of 4 m.

The ink was then jetted from the ink jet head of the ink jet printer such that the ink was applied on the undercoat layer formed on the substrate in the form of a solid image (Solid image shape) having a halftone dot rate of 100% and in the form of a 2-point line image.

The application of the ink was performed under the conditions of 400 dpi×400 dpi, single pass, and a substrate transportation speed of 50 m/min.

Next, the ink applied on the substrate was irradiated with an electron beam (EB).

The time from the landing of the ink to the start of the EB irradiation was 2.0 seconds.

The irradiation dose of EB was 40 KGly, and the acceleration voltage was 110 KV.

The irradiation of the ink on the substrate with EB was performed in a nitrogen purge atmosphere (specifically, in an atmosphere in which the oxygen concentration is 0.1% by volume or less and the nitrogen concentration is 99.9% by volume or more).

Under the above conditions, the ink applied on the substrate was subjected to full curing by EB irradiation to record an image (a solid image and a line image), thereby obtaining an article with a recorded image.

<Measurement and Evaluation>

The ink and the article with a recorded image were measured and evaluated as in Example 201.

The results are shown in Table 6.

TABLE 6

| | | | Example 401 |
|---|---|---|---|
| Components of undercoat liquid 3 (part A) | Polymerizable compound | 3MPDDA (bifunctional) | 69.4 |
| | | DPHA (hexafunctional) | 11.8 |
| | | UV-7630B (hexafunctional, Mw 2,200) | 17.7 |
| | Polymerization inhibitor | UV22 | 0.01 |
| | Surfactant | BYK307 | 1.2 |
| Components of undercoat liquid 3 (part B) | Isocyanate compound | D-170N | 100.0 |
| Components of ink (parts by mass) | Scale-like metal particle dispersion | In particle dispersion liquid 1 (solid content 60% by mass, containing only solvent as dispersion medium) | 10.0 |
| | Polymerizable compound | A-200 (bifunctional) | 90.0 |
| Equivalent circle diameter of scale-lime metal particles (nm) | | | 300 |
| Average thickness of scale-lime metal particles (nm) | | | 30 |
| Average aspect ratio of scale-lime metal particles | | | 10 |
| Content of solvent with respect to total amount of ink (% by mass) | | | 2.2 |

TABLE 6-continued

|  |  | Example 401 |
|---|---|---|
| Image recording condition | Ink application method | S |
|  | Time from landing of ink to start of EB irradiation (sec) | 2.0 |
| Average angle of scale-like metal particles in image (°) | Surface layer portion of image | 10 |
|  | Inner portion of image | 45 |
| Evaluation result | Metallic glossiness | A |
|  | Line quality | A |
|  | Elution resistance | AA |

—Explanation of Table 6—

Details of each component in Table 6 are as follows. Among the components in Table 6, for the components other than the following components, the explanations of Table 1 to 5 can be referred to.

A-200: "A-200" (polyethylene glycol #200 diacrylate) manufactured by SHIN-NAKAMURA CHEMICAL CO., LTD.

As shown in Table 6, in the article with a recorded image of Example 401 in which the scale-like metal particles were In particles, the average angle of the scale-like metal particles in the surface layer portion of the image was 30° or less, and the average angle of the scale-like metal particles in inner portion of the image was more than 30°, the image had excellent metallic glossiness. In the article with a recorded image of Example 401, the image was also excellent in the line quality and elution resistance.

The entire disclosure of Japanese Patent Application No. 2020-114335, filed Jul. 1, 2020, is incorporated into the present specification by reference.

All of documents, patent applications, and technical standards described in the present specification are incorporated into the present specification by reference to approximately the same extent as a case where it is specifically and respectively described that the respective documents, patent applications, and technical standards are incorporated by reference.

What is claimed is:

1. An active energy ray curable-type ink comprising:
    scale-like metal particles; and
    polymerizable compounds,
    wherein the scale-like metal particles contain indium and have an average equivalent circle diameter of 50 nm to 1,000 nm and an average aspect ratio, which is a ratio of the average equivalent circle diameter to an average thickness, of 5 to 100,
    wherein the polymerizable compounds include a polymerizable compound having a weight-average molecular weight of 1,000 or more, and
    a proportion of the polymerizable compound having a weight-average molecular weight of 1,000 or more in the polymerizable compounds is 50% by mass or more.

2. The active energy ray curable-type ink according to claim 1,
    wherein the scale-like metal particles are scale-like indium particles.

3. The active energy ray curable-type ink according to claim 1,
    wherein the polymerizable compounds include at least one of a monofunctional polymerizable compound or a bifunctional polymerizable compound, and
    a total proportion of the monofunctional polymerizable compound and the bifunctional polymerizable compound in the polymerizable compounds is 50% by mass or more.

4. The active energy ray curable-type ink according to claim 1, further comprising:
    an organic solvent,
    wherein a content of the organic solvent is 50% by mass or more with respect to a total amount of the active energy ray curable-type ink.

5. The active energy ray curable-type ink according to claim 1, wherein the active energy ray curable-type ink is an active energy ray curable-type jet ink.

6. An article with a recorded image, comprising:
    a substrate; and
    an image disposed on the substrate,
    wherein the image is a cured substance of the active energy ray curable-type ink according to claim 1, and within a cross section of the image, an average angle formed between a longitudinal direction of the scale-like metal particles and a surface of the substrate is 300 or less in a region that is within a distance of 100 nm from a surface of the image, and an average angle formed between the longitudinal direction of the scale-like metal particles and the surface of the substrate is more than 300 in a region that is beyond a distance of 100 nm from the surface of the image.

7. The article with a recorded image according to claim 6, wherein within the cross section of the image, the average angle formed between the longitudinal direction of the scale-like metal particles and the surface of the substrate is 100 or less in the region that is within a distance of 100 nm from the surface of the image.

8. The article with a recorded image according to claim 6, wherein the scale-like metal particles are scale-like indium particles.

9. An ink set comprising:
    the active energy ray curable-type ink according to claim 1; and
    at least one of an undercoat liquid or an overcoat liquid,
    wherein the undercoat liquid contains polymerizable compounds but does not contain scale-like metal particles,
    the polymerizable compounds contained in the undercoat liquid include at least one of a monofunctional polymerizable compound or a bifunctional polymerizable compound,
    a total proportion of the monofunctional polymerizable compound and the bifunctional polymerizable compound in the polymerizable compounds contained in the undercoat liquid is 50% by mass or more,
    the overcoat liquid contains polymerizable compounds and an organic solvent but does not contain scale-like metal particles,
    a proportion of a polymerizable compound having a weight-average molecular weight of 1,000 or more in the polymerizable compounds contained in the overcoat liquid is 50% by mass or more, and a content of the organic solvent is 50% by mass or more with respect to a total amount of the overcoat liquid.

10. A manufacturing method of an article with a recorded image using the active energy ray curable-type ink according to claim 1, the manufacturing method comprising:

an ink applying step of applying the active energy ray curable-type ink on a substrate, and a curing step A of curing the active energy ray curable-type ink applied on the substrate by irradiation with an active energy ray A to obtain an image, wherein a time from landing of the active energy ray curable-type ink on the substrate to start of the irradiation of the active energy ray curable-type ink with the active energy ray A is 0.5 seconds or longer.

11. The manufacturing method of an article with a recorded image according to claim 10, wherein the time from landing of the active energy ray curable-type ink on the substrate to start of the irradiation of the active energy ray curable-type ink with the active energy ray A is 1.0 second or longer.

12. The manufacturing method of an article with a recorded image according to claim 10, wherein the time from landing of the active energy ray curable-type ink on the substrate to start of the irradiation of the active energy ray curable-type ink with the active energy ray A is 5.0 seconds or less.

13. The manufacturing method of an article with a recorded image according to claim 10, wherein the irradiation with the active energy ray A is performed in an atmosphere at an oxygen concentration of 0.1% by volume or less.

14. The manufacturing method of an article with a recorded image according to claim 10, wherein a content of a photopolymerization initiator in the active energy ray curable-type ink is less than 1% by mass with respect to a total amount of the active energy ray curable-type ink, and the active energy ray A is an electron beam.

15. The manufacturing method of an article with a recorded image according to claim 10, further comprising:

a semi-curing step which is performed between the ink applying step and the curing step A after the ink applying step and is a step of semi-curing the active energy ray curable-type ink applied on the substrate by irradiation with an active energy ray P having irradiation energy lower than irradiation energy of an active energy ray A, wherein the curing step A is a step of curing the semi-cured active energy ray curable-type ink by irradiation with the active energy ray A to obtain the image.

16. The manufacturing method of an article with a recorded image according to claim 10, wherein the ink applying step is a step of applying the active energy ray curable-type ink on the substrate by a single-pass ink jet method.

17. The manufacturing method of an article with a recorded image according to claim 10, further comprising:

a step of applying an undercoat liquid on the substrate and semi-curing the applied undercoat liquid before the ink applying step to form an undercoat layer, wherein the undercoat liquid contains polymerizable compounds but does not contain scale-like metal particles, the polymerizable compounds contained in the undercoat liquid include at least one of a monofunctional polymerizable compound or a bifunctional polymerizable compound, a total proportion of the monofunctional polymerizable compound and the bifunctional polymerizable compound in the polymerizable compounds contained in the undercoat liquid is 50% by mass or more, and the ink applying step is a step of applying the active energy ray curable-type ink on the undercoat layer formed on the substrate.

18. The manufacturing method of an article with a recorded image according to claim 10, further comprising:

a step of applying an overcoat liquid on the image and curing the applied overcoat liquid after the curing step A to form an overcoat layer, wherein the overcoat liquid contains polymerizable compounds and an organic solvent but does not contain scale-like metal particles, a proportion of a polymerizable compound having a weight-average molecular weight of 1,000 or more in the polymerizable compounds contained in the overcoat liquid is 50% by mass or more, and a content of the organic solvent is 50% by mass or more with respect to a total amount of the overcoat liquid.

* * * * *